(12) United States Patent
Ye et al.

(10) Patent No.: US 8,369,379 B2
(45) Date of Patent: Feb. 5, 2013

(54) PACKET SYNCHRONIZING FOR COMMUNICATIONS OVER A WIRELESS COMMUNICATION SYSTEM

(75) Inventors: Zhenzhen Ye, Amherst, MA (US);
Chunjie Duan, Medfield, MA (US);
Philip Orlik, Cambridge, MA (US);
Jinyun Zhang, Cambridge, MA (US)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 932 days.

(21) Appl. No.: 12/453,685

(22) Filed: May 19, 2009

(65) Prior Publication Data

US 2009/0296684 A1    Dec. 3, 2009

Related U.S. Application Data

(60) Provisional application No. 61/071,818, filed on May 19, 2008.

(51) Int. Cl.
*H04B 1/7156* (2011.01)
*H04L 27/28* (2006.01)
*H04J 4/00* (2006.01)

(52) U.S. Cl. ......... 375/136; 375/260; 375/343; 370/436
(58) Field of Classification Search ............... 375/134, 375/136, 137, 260, 343, 354; 370/343, 436, 370/480
See application file for complete search history.

(56) References Cited

U.S. PATENT DOCUMENTS

| | | | |
|---|---|---|---|
| 7,567,533 B2* | 7/2009 | Lai | 370/436 |
| 7,693,237 B2* | 4/2010 | Mehrnia et al. | 375/343 |
| 7,924,953 B2* | 4/2011 | Choi et al. | 375/343 |
| 2007/0211785 A1* | 9/2007 | Nakache et al. | 375/136 |
| 2009/0154529 A1* | 6/2009 | Cho et al. | 375/137 |

OTHER PUBLICATIONS

Schmidl, T. et al., "Robust frequency and timing synchronization for OFDM," IEEE Trans. Commun., vol. 45, No. 12, 1997, pp. 1613-1621.

Muller-Weinfurtner, S.H., "On the Optimality of Metrics for Coarse Frame Synchronization in OFDM: a Comparison", IEEE PIMRC '98, 1998.

Tufvesson, F. et al., "Time and frequency synchronization for OFDM using PN-sequence preambles," IEEE VTC, vol. 4, Amsterdam, The Netherlands, Sep. 1999, pp. 2203-2207.

Speth, M. et al., "Optimum Receiver Design for Wireless Broad-Band Systems Using OFDM—Part I," IEEE Trans. on Commun., vol. 47, No. 11, Nov. 1999, pp. 1668-1677.

Speth, M. et al., "Optimum Receiver Design for OFDM-Based Broadband Transmission—Part II," IEEE Trans. on Commun., vol. 49, No. 4, Apr. 2001, pp. 571-578.

(Continued)

*Primary Examiner* — Betsy Deppe
(74) *Attorney, Agent, or Firm* — Buchanan Ingersoll & Rooney PC

(57) ABSTRACT

Synchronization methods and systems for communications over a multi-band system are presented. A synchronization technique for communications over a multi-band system includes receiving a packet of preamble symbols respectively transmitted over a sequence of frequency sub-bands according to one of a plurality of frequency hopping patterns, wherein the plurality of frequency hopping patterns are partitioned into a plurality of disjoint groups, each group having a different associated periodicity; computing, in parallel, respective autocorrelation values of the packet received in a selected frequency sub-band at a plurality of symbol delays; and selecting one of the plurality of groups of frequency hopping patterns based on the autocorrelation values at the plurality of symbol delays.

22 Claims, 24 Drawing Sheets

500 Synchronization based on a four parallel ACF units structure

OTHER PUBLICATIONS

Muquet, B. et al., "Cyclic prefix or zero padding OFDM for wireless multicarrier transmissions," IEEE Trans. on Commun., vol. 50, Dec. 2002, pp. 2136-2148.

Molisch, A.F. et al, "Channel models for ultrawideband Personal Area Networks," IEEE Personal Communications Magazine, No. 55, 2003, pp. 14-21.

Krstic, M. et al., "Optimized low-power synchronizer design for the IEEE 802.11(a) standard," IEEE ICASSP 2003, Hong Kong, 2003, pp. 333-336.

Minn, H. et al., "A robust timing and frequency synchronization for OFDM systems," IEEE Trans. Wireless Commun., vol. 2, No. 4, Jul. 2003, pp. 822-839.

Batra, A. et al., "Design of a multiband OFDM system for realistic UWB channel environments," IEEE Trans. Microw. Theory Tech., vol. 52, No. 9, Sep. 2004, pp. 2123-2138.

Coulson, A.J., "Narrowband interference in pilot symbol assisted OFDM systems," IEEE Trans. Wireless Commun., vol. 3, No. 6, Nov. 2004, pp. 2277-2287.

ECMA, "High Rate Ultra-Wideband PHY and MAC Standard," Standard ECMA-368, 1st ed., Dec. 2005.

Authaudage, C.R.N. et al., "Sensitivity of FFT-equalised zeropadded OFDM systems to time and frequency synchronisation errors," IEEE Proc. on Commun., vol. 152, No. 6, Dec. 2005, pp. 945-951.

Yoon, S. et al., "Packet Detection and Symbol Timing Synchronization Algorithm for Multi-Band OFDM UWB," IEICE Trans. on Commun., vol. E89-B, No. 4, Apr. 2006, pp. 1433-1435.

Liu, H. et al., "A Low-Complexity Synchronizer for OFDM-Based UWB System," IEEE Trans. on Circuits and Systems—Part II, vol. 53, No. 11, Nov. 2006, pp. 1269-1273.

Shi, K. et al., "Impacts of Narrowband Interference on OFDM-UWB Receivers: Analysis and Mitigation," IEEE Trans. on Signal Processing, vol. 55, No. 3, Mar. 2007, pp. 1118-1128.

Ye, Z. et al., "A Low-Complexity Synchronization Design for MB-OFDM Ultra-Wideband Systems," Technical Report, Mitsubishi Electric Research Laboratories, Inc., May 2008, 8 pages.

* cited by examiner

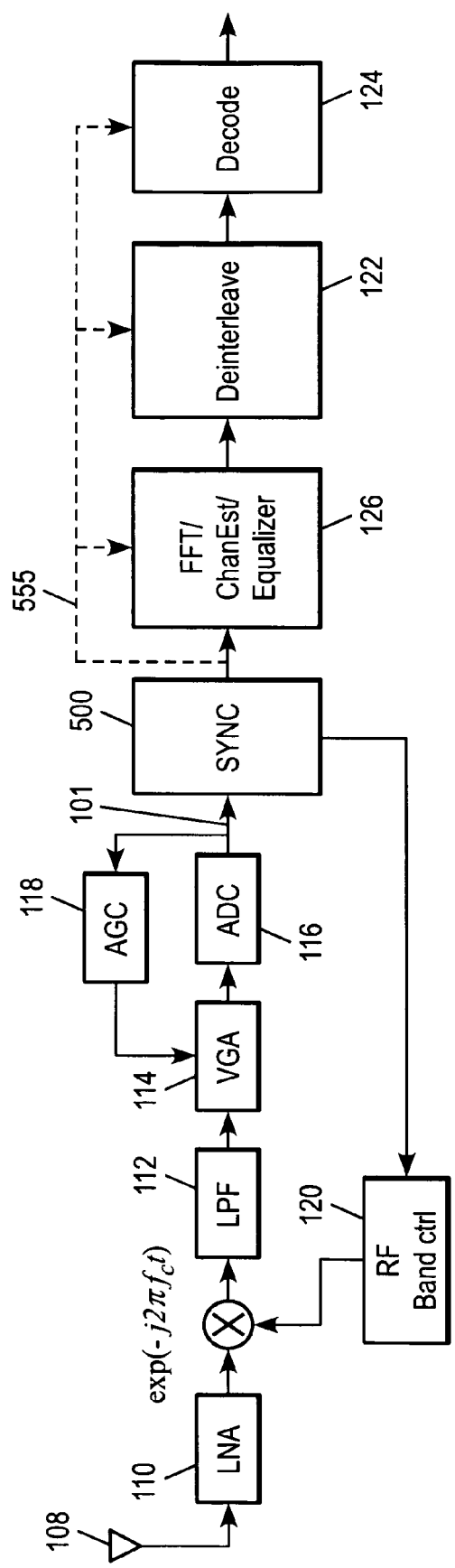
FIG. 1   A MB-OFDM UWB Receiver Architecture

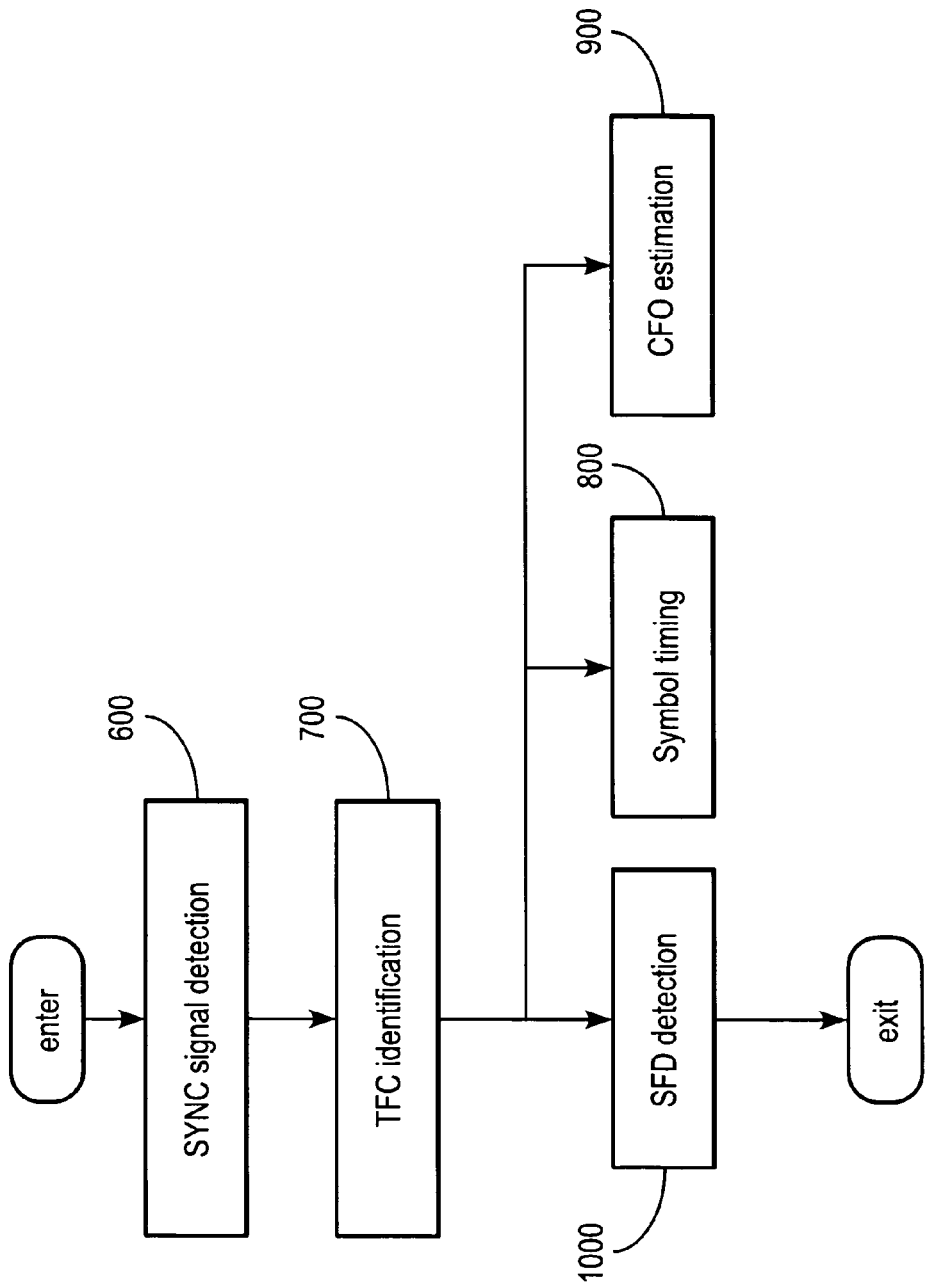
FIG. 2  Synchronization Tasks

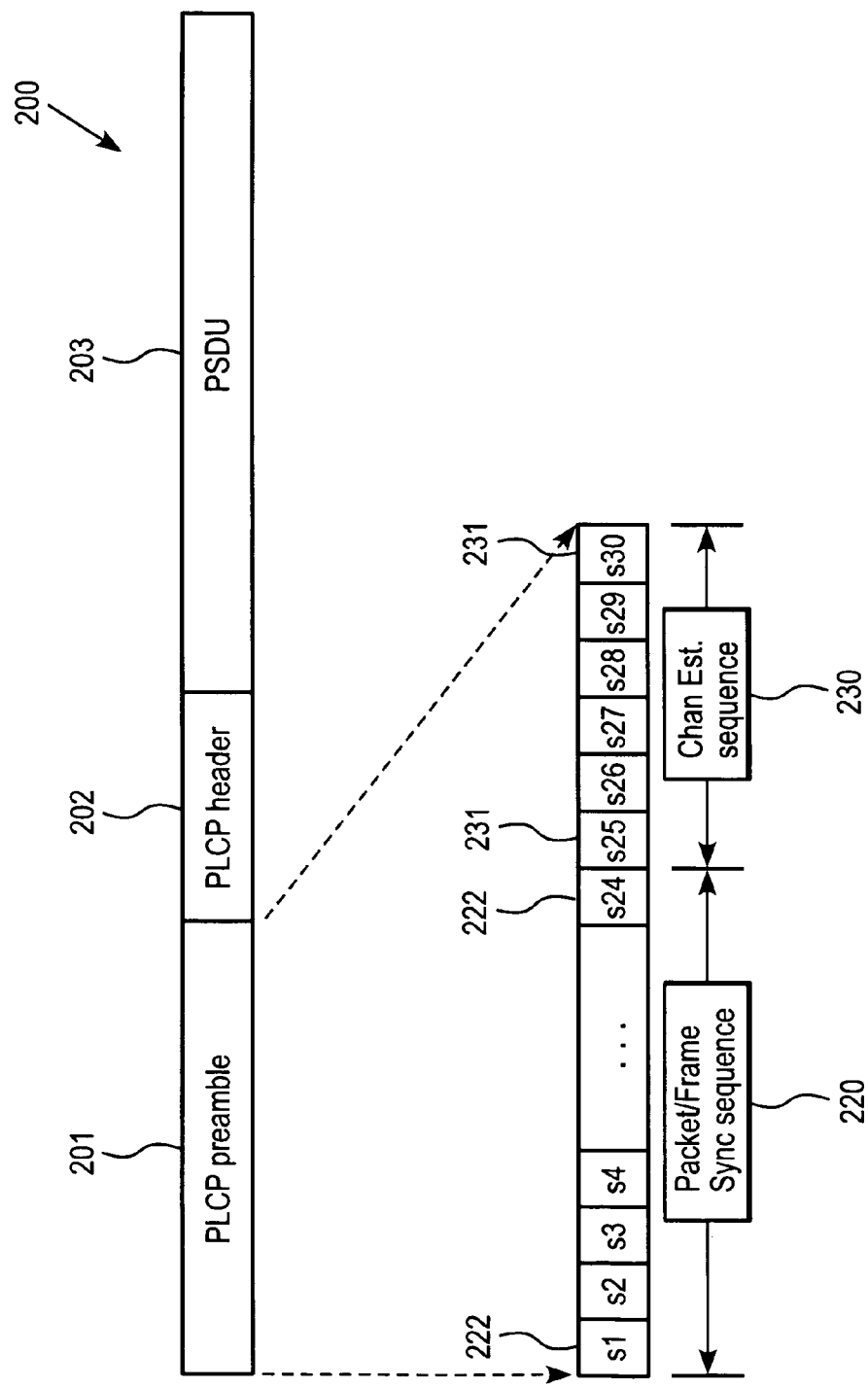
FIG. 3  200 WiMedia MBOFDM-UWB Packet Structure

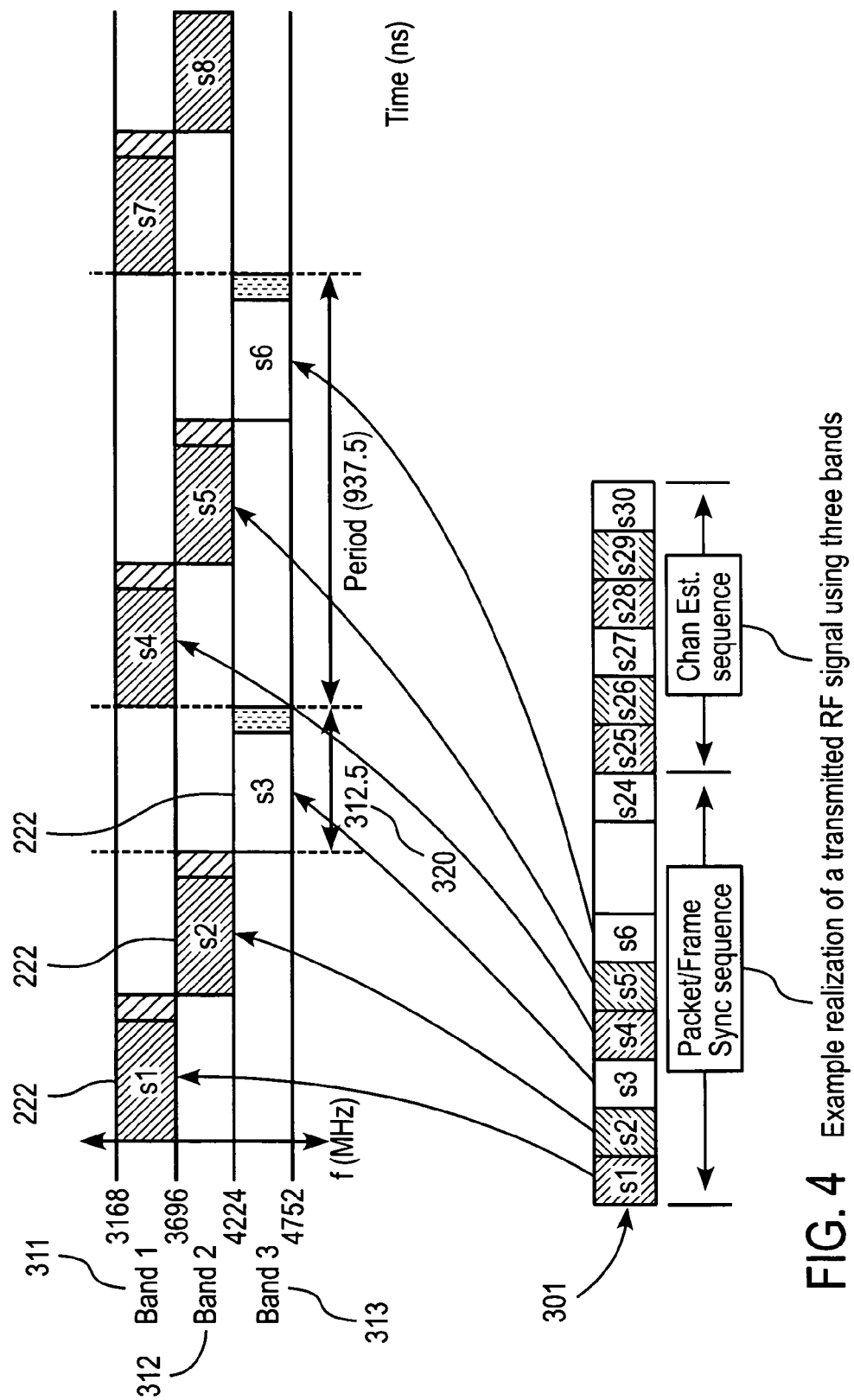
FIG. 4  Example realization of a transmitted RF signal using three bands

| TFC number | Band Sequence | Band ID for TFC | | | | | | |
|---|---|---|---|---|---|---|---|---|
| 1 | 1 | 1 | 2 | 3 | 1 | 2 | 3 |
| 2 | 2 | 1 | 3 | 2 | 1 | 3 | 2 |
| 3 | 3 | 1 | 1 | 2 | 2 | 3 | 3 |
| 4 | 4 | 1 | 1 | 3 | 3 | 2 | 2 |
| 5 | 5 | 1 | 2 | 1 | 1 | 2 | 1 |
| 6 | 6 | 2 | 3 | 2 | 2 | 2 | 2 |
| 7 | 7 | 3 | 3 | 3 | 3 | 3 | 3 |

FIG. 5   Time Frequency Codes and Preamble Pattern for Band Group 1

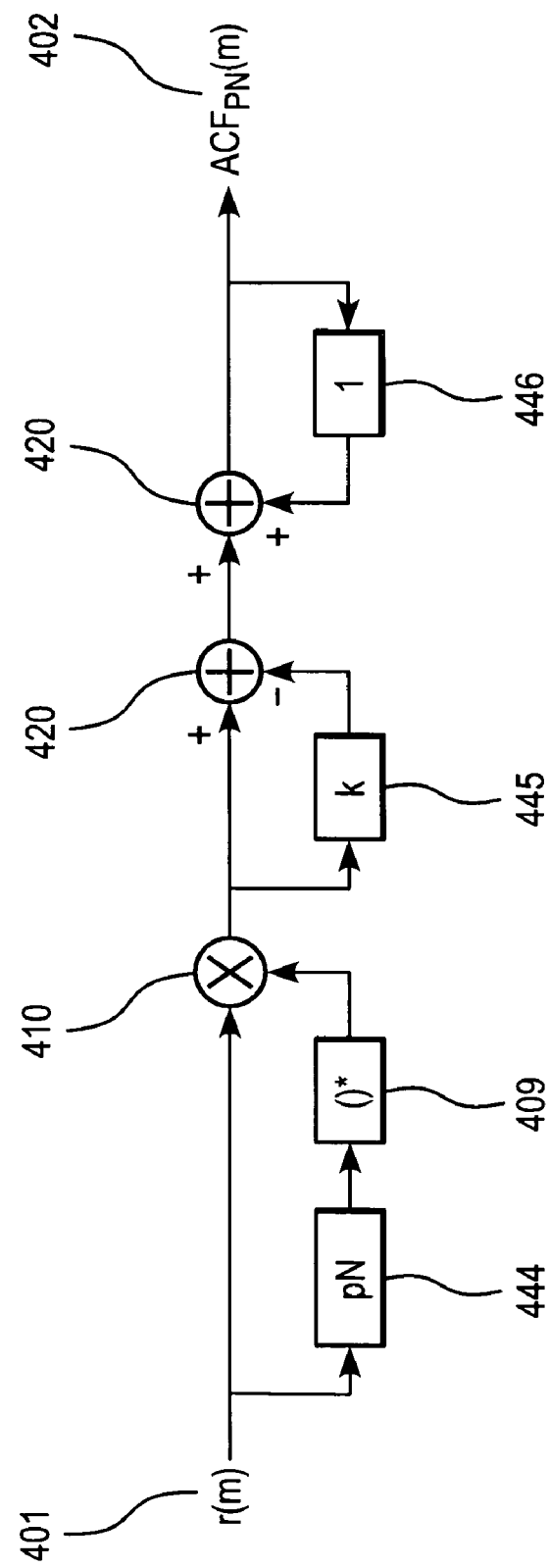
FIG. 6 Auto-correlation function (ACF) unit

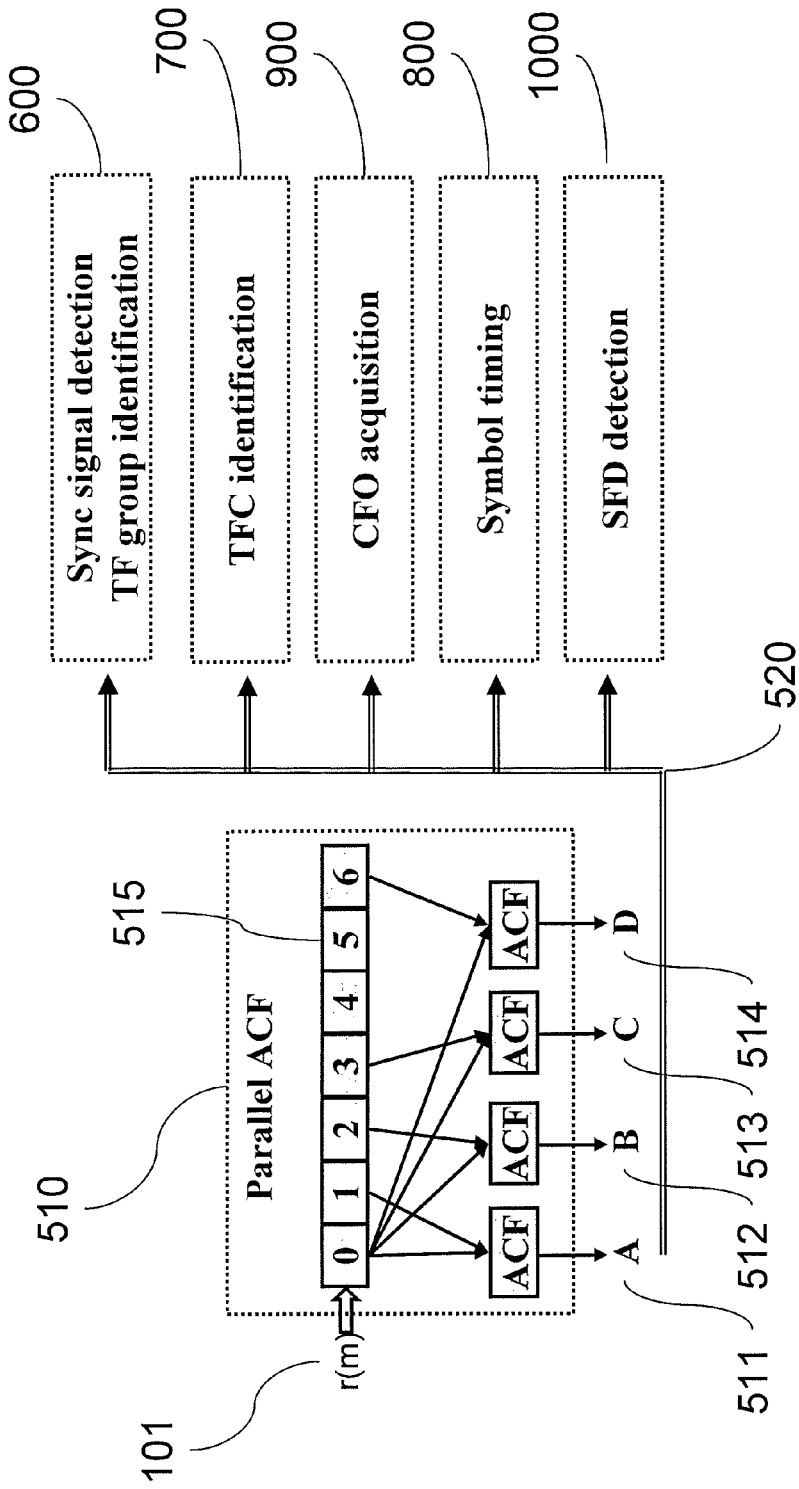
Fig 7. 500 Synchronization based on a four parallel ACF units structure

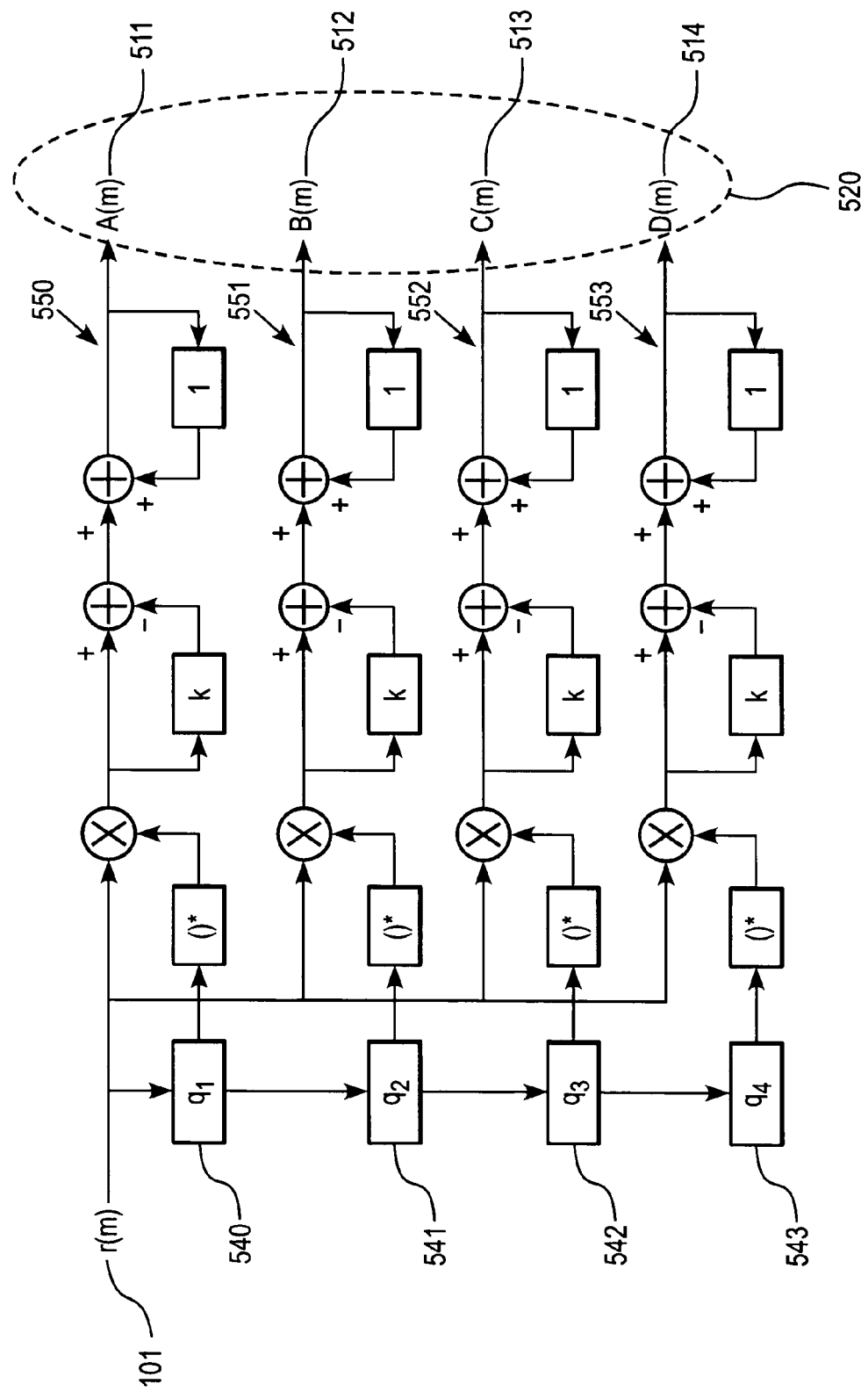
FIG. 8  510 a four parallel ACF structure

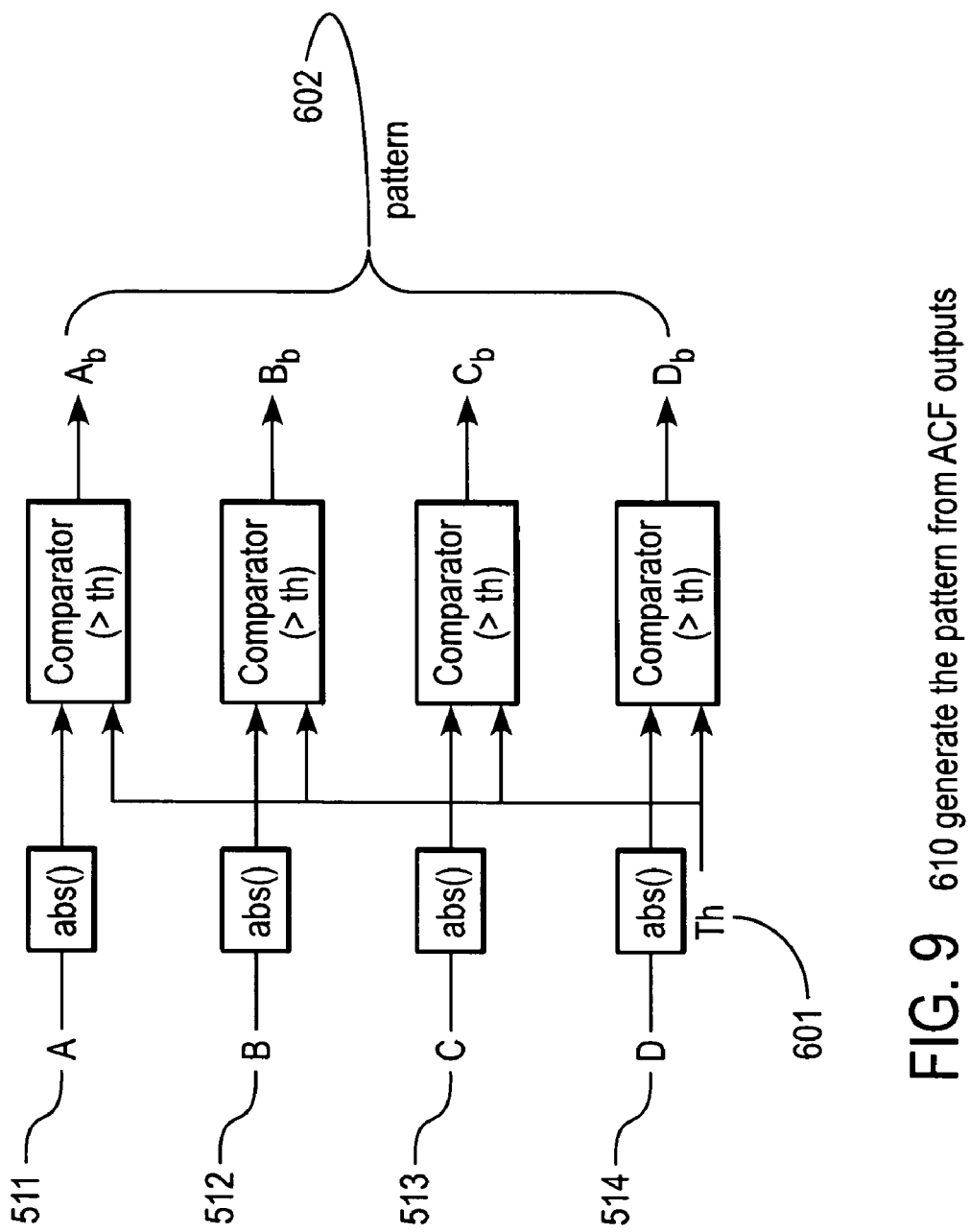
FIG. 9  610 generate the pattern from ACF outputs

| TGRP | Possible TFCs | $A_b$ | $B_b$ | $C_b$ | $D_b$ |
|---|---|---|---|---|---|
| 1 | 1,2 | 0 | 0 | 1 | 1 |
| 2 | 3,4 | 1 | 0 | 0 | 1 |
| 3 | 5,6,7 | 1 | 1 | 1 | 1 |

FIG. 10  610 generate the pattern from ACF outputs

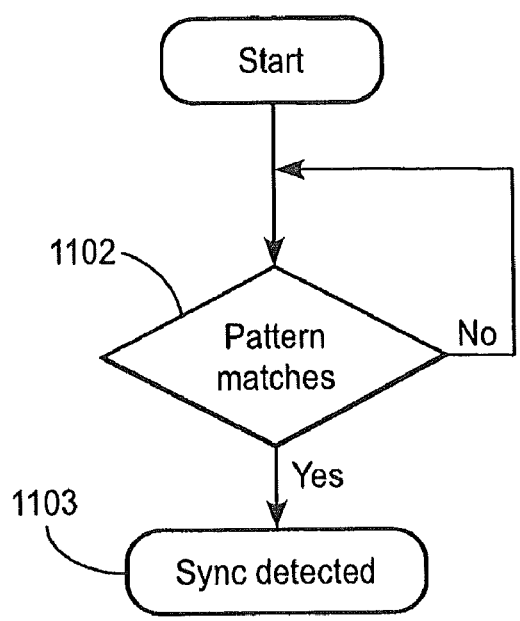
FIG. 11  600 Signal detection and TFC group identification flow chart

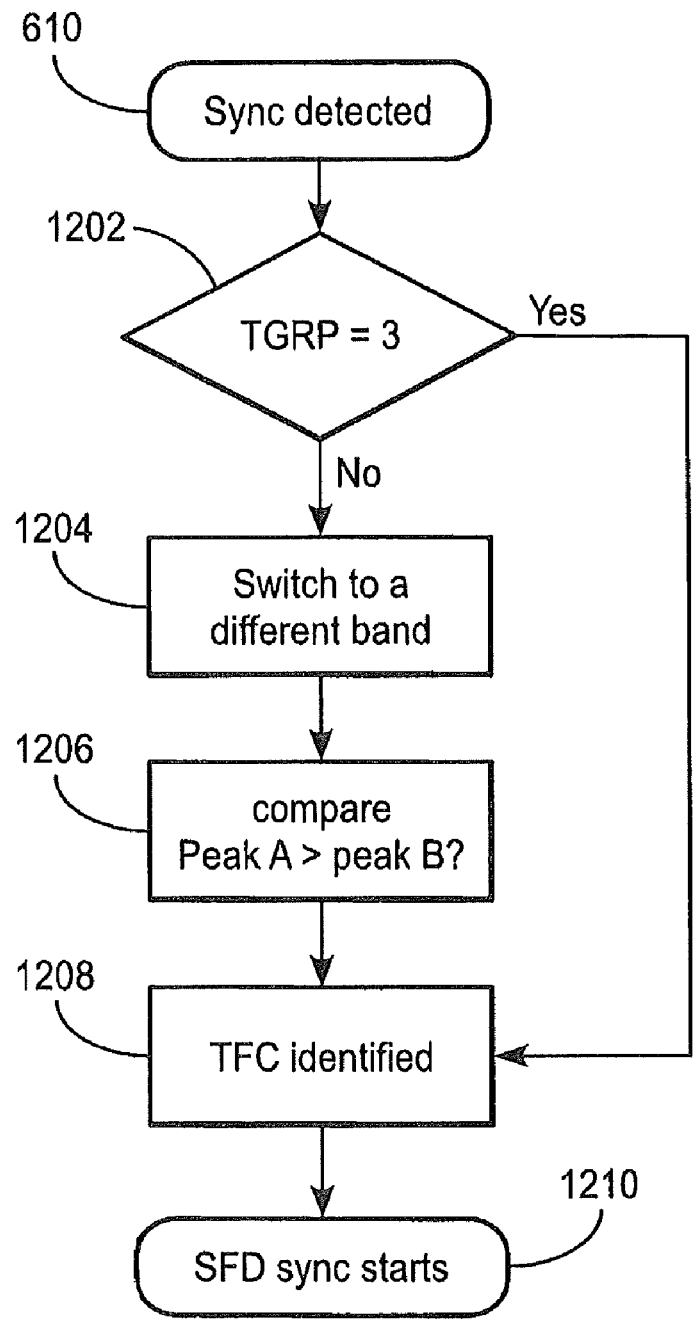
FIG. 12  700 procedure of TFC identification

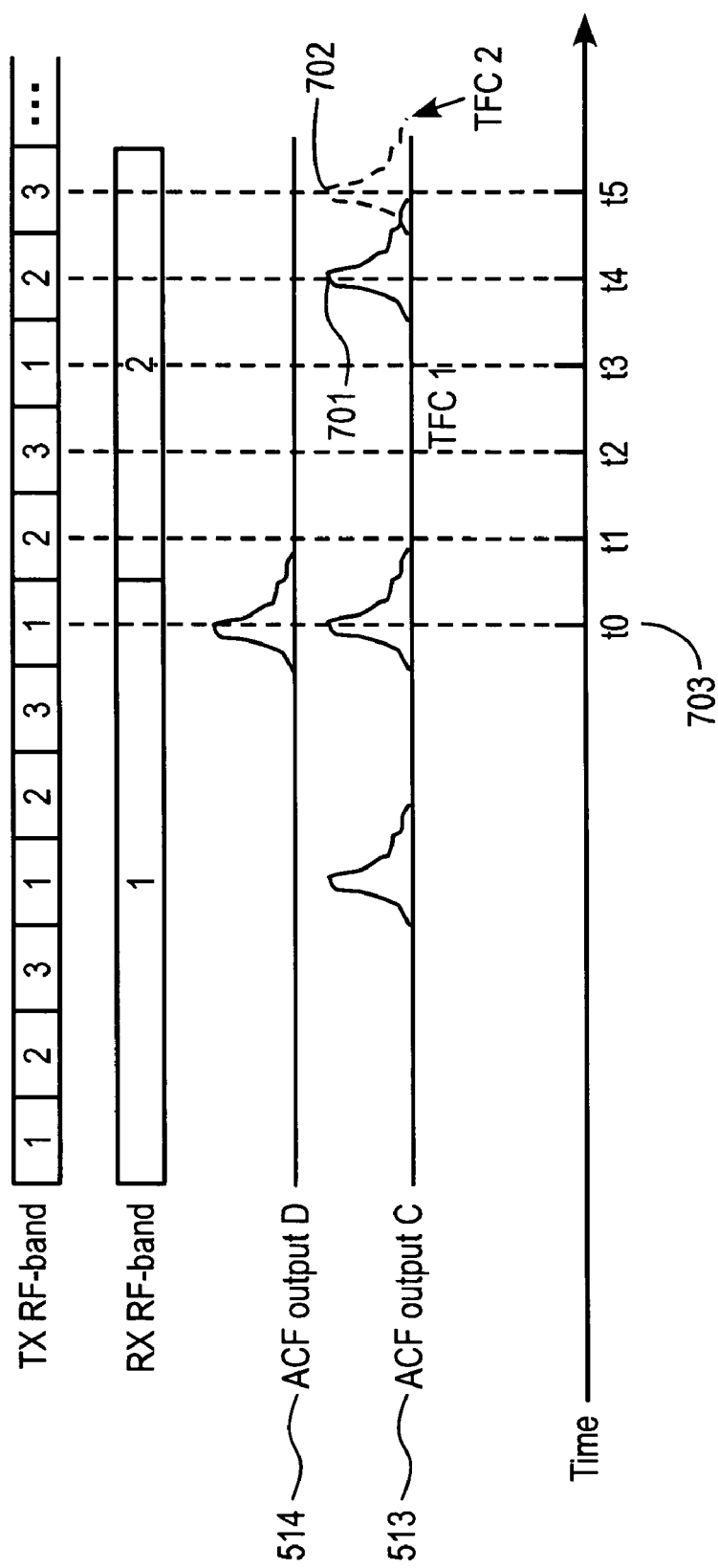
FIG. 13 illustration of TFC identification process

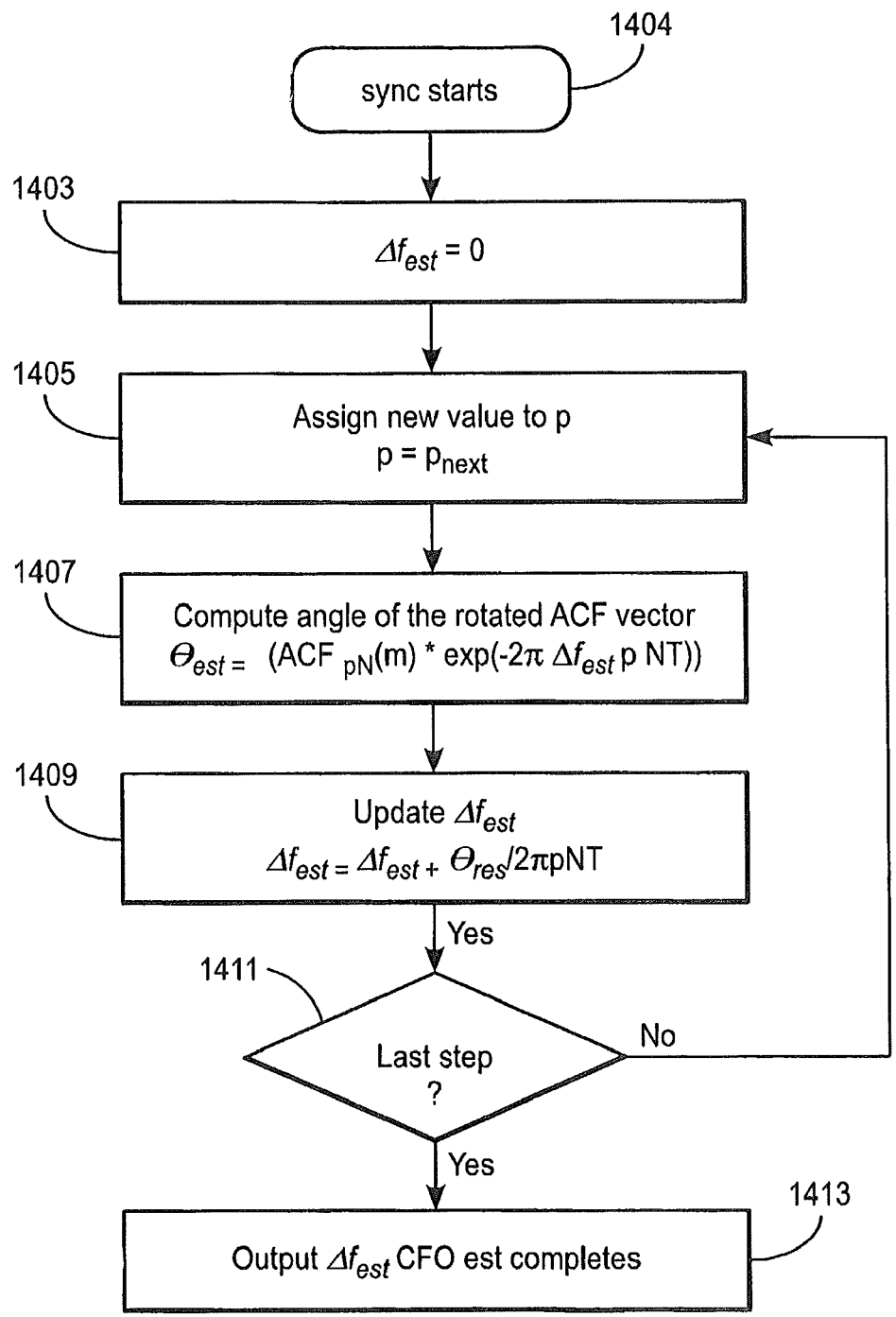
FIG. 14   Recursive procedure for CFO estimation

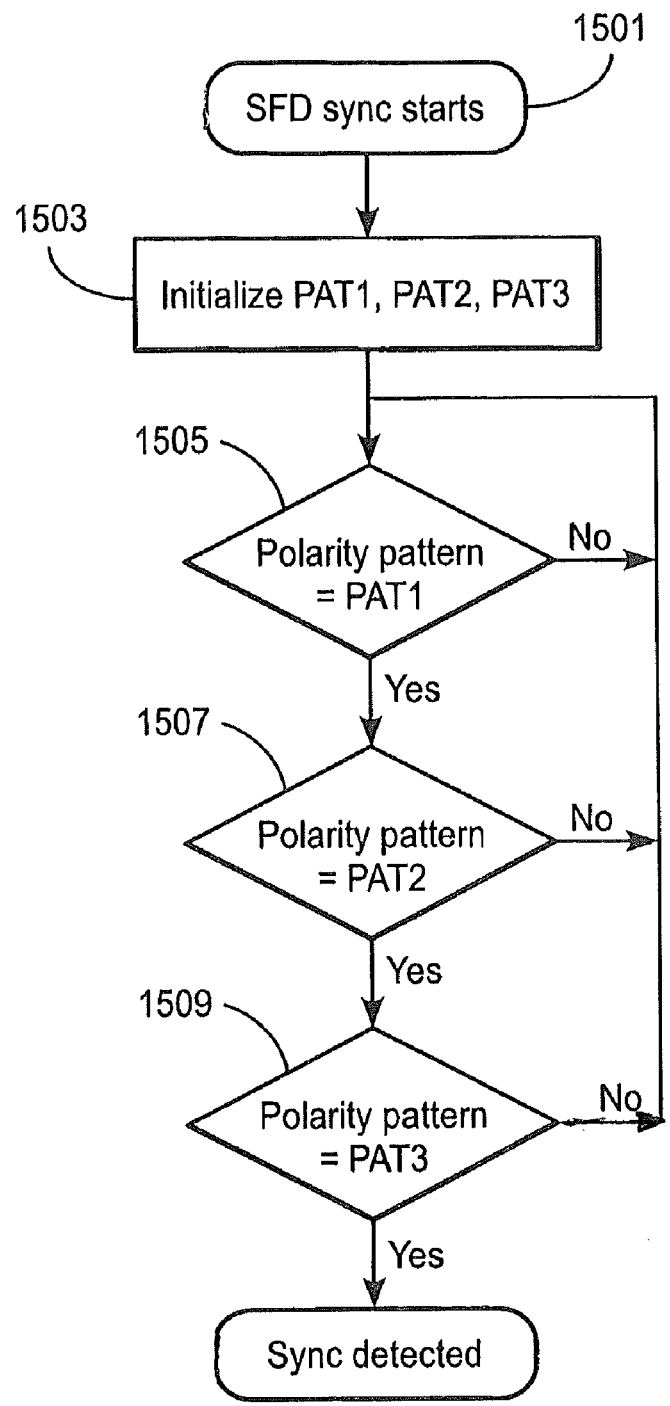
FIG. 15 1000 Start of Frame Delimiter detection

FIG. 17 illustration of TFC identification process

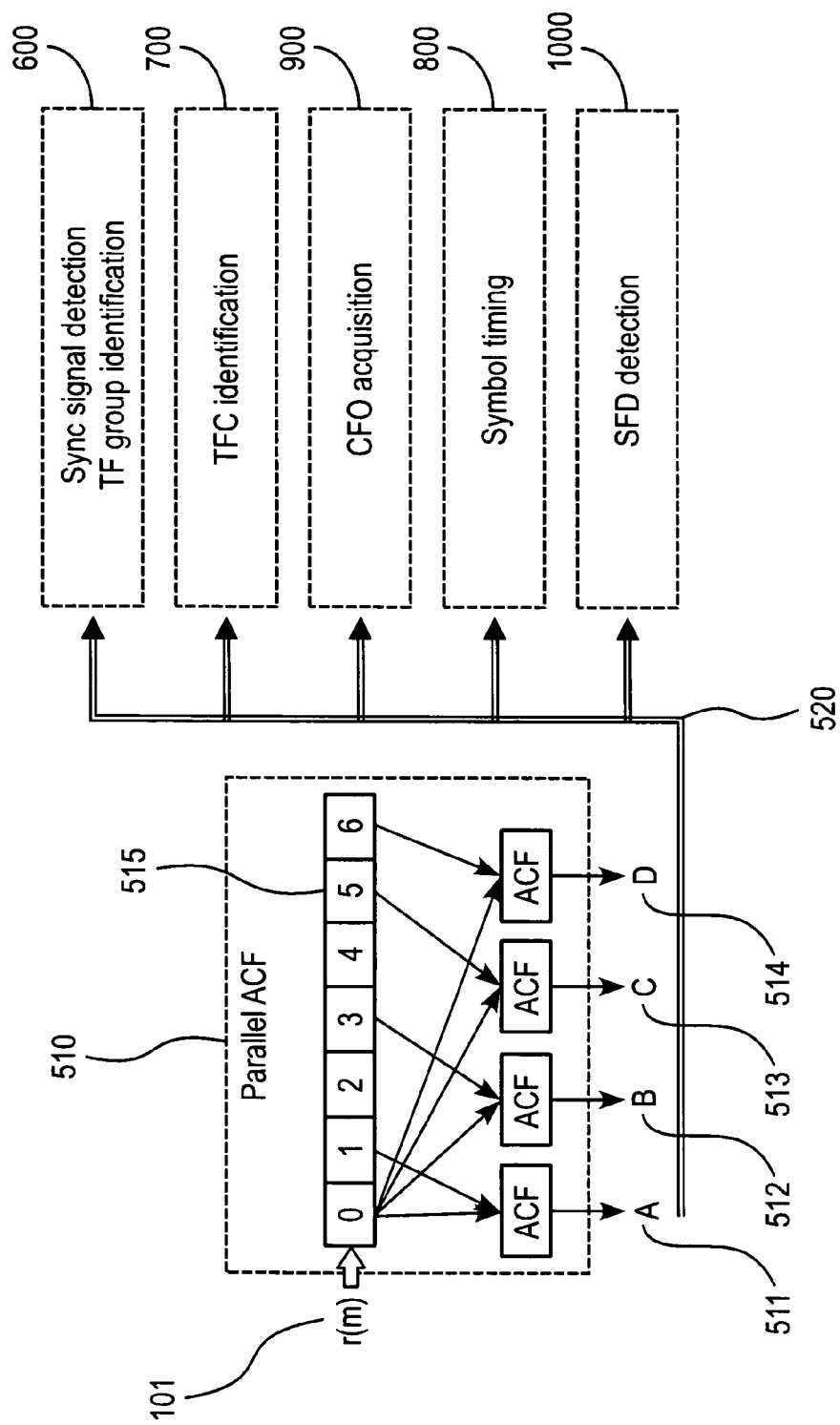
FIG. 22  500 Synchronization based on a four parallel ACF units structure

| TGRP | Possible TFCs | $A_b$ | $B_b$ | $C_b$ | $D_b$ |
|---|---|---|---|---|---|
| 1 | 1,2 | 0 | 1 | 0 | 1 |
| 2 | 3,4 | 0 | 0 | 1 | 1 |
|  |  | 1 | 0 | 0 | 1 |
| 3 | 5,6,7 | 1 | 1 | 1 | 1 |

FIG. 23  610 generate the pattern from ACF outputs

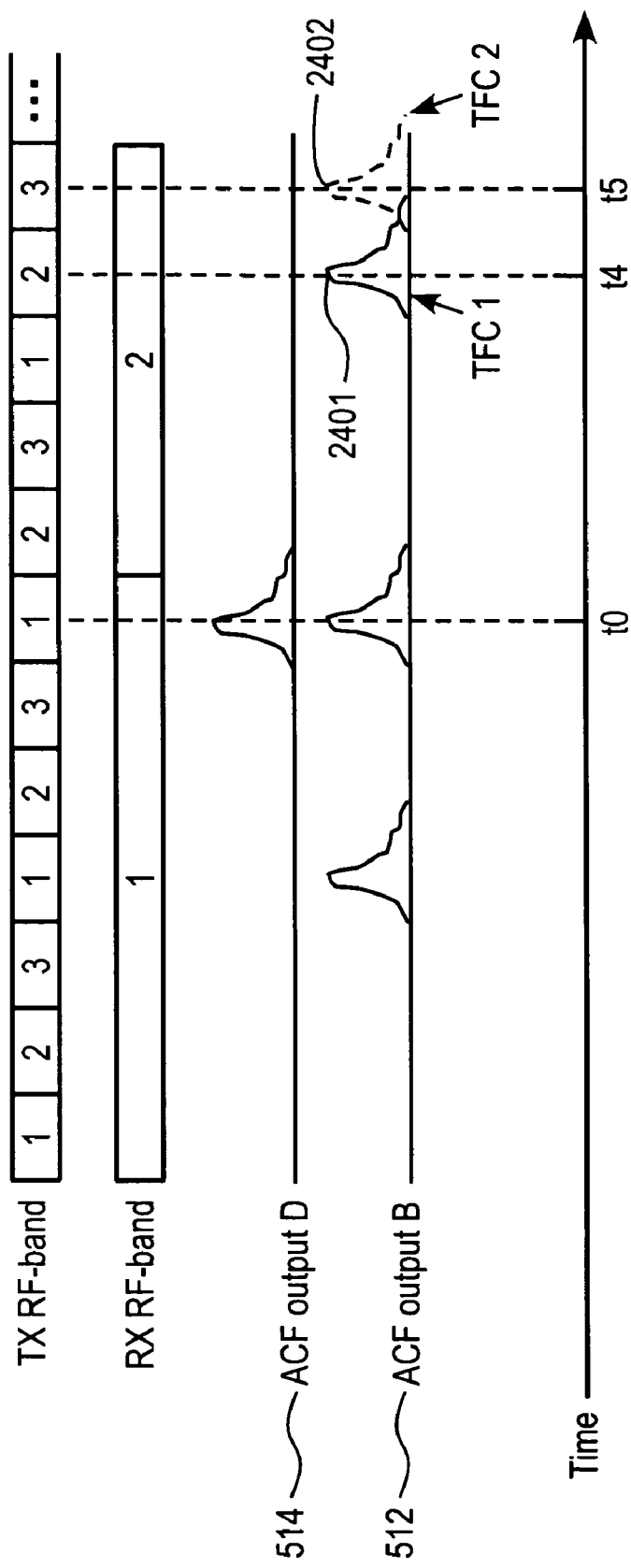
FIG. 24 Illustration of TFC identification process

PACKET SYNCHRONIZING FOR COMMUNICATIONS OVER A WIRELESS COMMUNICATION SYSTEM

CROSS-REFERENCE TO RELATED APPLICATION

This application claims the benefit of U.S. Provisional Patent Application No. 61/071,818, filed on May 19, 2008, in the United States Patent and Trademark Office, the disclosure of which is incorporated herein in its entirety by reference.

FIELD OF THE DISCLOSURE

The present disclosure involves the field of wireless communications. More particularly, the present disclosure relates to synchronization techniques, systems and methods for a wireless communication system, such as a WiMedia Multi-Band Orthogonal Frequency Division Multiplexing (MB-OFDM) Ultra Wideband (UWB) system.

DESCRIPTION OF THE RELATED ART

Different techniques for synchronizing packets of data received via a plurality of frequency sub-bands have been proposed. For example, U.S. Patent Application Publication No. 2005/0176371 (published Aug. 11, 2005) relates to synchronization of time frequency codes. Similarly, U.S. Patent Application Publication No. 2005/0078598 (published Apr. 14, 2005) pertains to enhancements to the Multiband Orthogonal Frequency Division Multiplexing (OFDM) Physical Layer.

Different techniques for optimizing packet synchronizing in MB-OFDM UWB based systems have been proposed. For example, articles respectively entitled "Impacts of Narrowband Interference on OFDM-UWB Receivers" (K. Shi, Y. Zhou, B. Kelleci, T. W. Fischer, E. Serpedin, A. Iker Karsilayan, IEEE Trans. on Signal Processing, Vol. 55, no. 3, pp. 1118-1128, Mar. 2007), "Packet Detection and Symbol Timing Synchronization Algorithm for Multi-Band OFDM UWB" (S. YOON and J. CHONG, IEICE Trans. on Commun., Vol. E89-B No. 4 pp. 1433-1435, April 2006), and "A Low-Complexity Synchronizer for OFDM-Based UWB System" (H. Liu and C. Lee, IEEE Trans. On Circuits and Systems-Part II, Vol. 53, no. 11, pp. 1269-1273, November 2006) relate to using a matched filter in synchronization symbol detection and symbol timing.

BACKGROUND

Many communication networks transmit data in packets. Because these methods transmit packets at random times, and because of transmission delays, synchronization of a receiver to incoming packets is needed. Thus, most transmitters send a preamble, which can be a particular sequence of identical symbols, to enable packet detection and synchronization in the receiver. Furthermore, the receiver can use the preamble to estimate several related parameters, such as a frequency offset and channel state information.

Synchronizing to the packets and estimating the related parameters become more difficult, however, when the symbols are transmitted over a plurality of frequency sub-bands according to a frequency hopping pattern. In such systems, each network uses a different sequence of sub-bands to transmit and receive packets, called a "frequency hopping pattern," to reduce collisions between devices belonging to different networks. A transceiver using this mode of transmission over several frequency bands is called a "frequency hopping" transceiver.

An example of a system implementing frequency hopping is an MB-OFDM UWB system. An MB-OFDM UWB is a wireless communication technology that can be used in many systems including a high data-rate, short-range wireless personal network (WPAN).

The performance of the synchronization has direct implication on the overall system performance as errors introduced by the synchronization, misses in acquisition, estimation errors in timing and carrier frequency offset can degrade the overall system performance significantly.

However, the receiver synchronization circuit has been identified as one of the most power consuming circuits in the baseband section of the radio. This is due to the active duty cycle of the synchronization being generally much higher than other baseband components. Therefore, for applications involving mobile/portable devices, such as applications of MB-OFDM UWB based systems, reduced-power or reduced-complexity solutions for synchronization are needed.

BRIEF SUMMARY OF THE DISCLOSURE

Methods and systems for synchronizing to frequency hopped packets are described herein.

In accordance with an aspect of the present disclosure, a synchronization method for communications over a multi-band system includes receiving a packet of preamble symbols respectively transmitted over a sequence of frequency sub-bands according to one of a plurality of frequency hopping patterns, wherein the plurality of frequency hopping patterns are partitioned into a plurality of disjoint groups, each group having a different associated periodicity; computing, in parallel, respective autocorrelation values of the packet received in a selected frequency sub-band at a plurality of symbol delays; and selecting one of the plurality of groups of frequency hopping patterns based on the autocorrelation values at the plurality of symbol delays.

In accordance with another aspect of the present disclosure, a synchronization system for communications over a multi-band system includes a receiving unit configured to receive a packet comprising preamble symbols respectively transmitted over a sequence of frequency sub-bands according to one of a plurality of frequency hopping patterns, wherein the plurality of frequency hopping patterns are partitioned into a plurality of disjoint groups, each group having a different associated periodicity; and a synchronizing unit coupled to the receiver unit configured to synchronize to the received packet, wherein the synchronizing unit includes a plurality of autocorrelation units, which compute, in parallel, respective autocorrelation values of the packet received in a selected frequency sub-band at a plurality of symbol delays.

BRIEF DESCRIPTION OF THE DRAWINGS

FIG. 1 is a block diagram of an example of a receiver;

FIG. 2 illustrates an example of the tasks carried out by a synchronization function performed by the receiver;

FIG. 3 illustrates an example of a structure of an MB-OFDM UWB packet;

FIG. 4 illustrates an example of transmitting radio frequency (RF) signals in accordance with a hopping pattern;

FIG. 5 illustrates a set of seven hopping patterns in accordance with the MB-OFDM standard, or European Computer Manufacturers Association (ECMA)-316;

FIG. 6 is a block diagram of an example of a related art autocorrelation function (ACF) implementation;

FIG. 7 is a high level block diagram of an exemplary embodiment of a synchronization design based on parallel ACF structures;

FIG. 8 illustrates an exemplary embodiment of a synchronization unit based on parallel ACF structures;

FIG. 9 illustrates an exemplary threshold pattern generation of a synchronization design based on parallel ACF structures;

FIG. 10 illustrates an exemplary embodiment of time-frequency groups (TF groups or TGRPs) and their corresponding generated patterns;

FIG. 11 is a flow chart illustrating an exemplary embodiment of symbol detection and TF group identification;

FIG. 12 is a flow chart illustrating an exemplary embodiment of time-frequency code (TFC) identification;

FIG. 13 illustrates an example of TFC identification;

FIG. 14 is a flow chart illustrating an exemplary embodiment of a recursive carrier frequency offset (CFO) estimation technique;

FIG. 15 is a flow chart illustrating an exemplary embodiment of detecting start of frame delimiter (SFD);

FIG. 22 is a high level block diagram of a second exemplary embodiment of a synchronization design based on parallel ACF structures;

FIG. 23 illustrates an exemplary embodiment of time-frequency groups (TF groups or TGRPs) and their corresponding generated patterns for the second exemplary embodiment of synchronization design based on parallel ACF structures; and FIG. 24 illustrates an example of TFC identification for the second exemplary embodiment of synchronization design based on parallel ACF structures.

DETAILED DESCRIPTION

Overview

Figure 16:
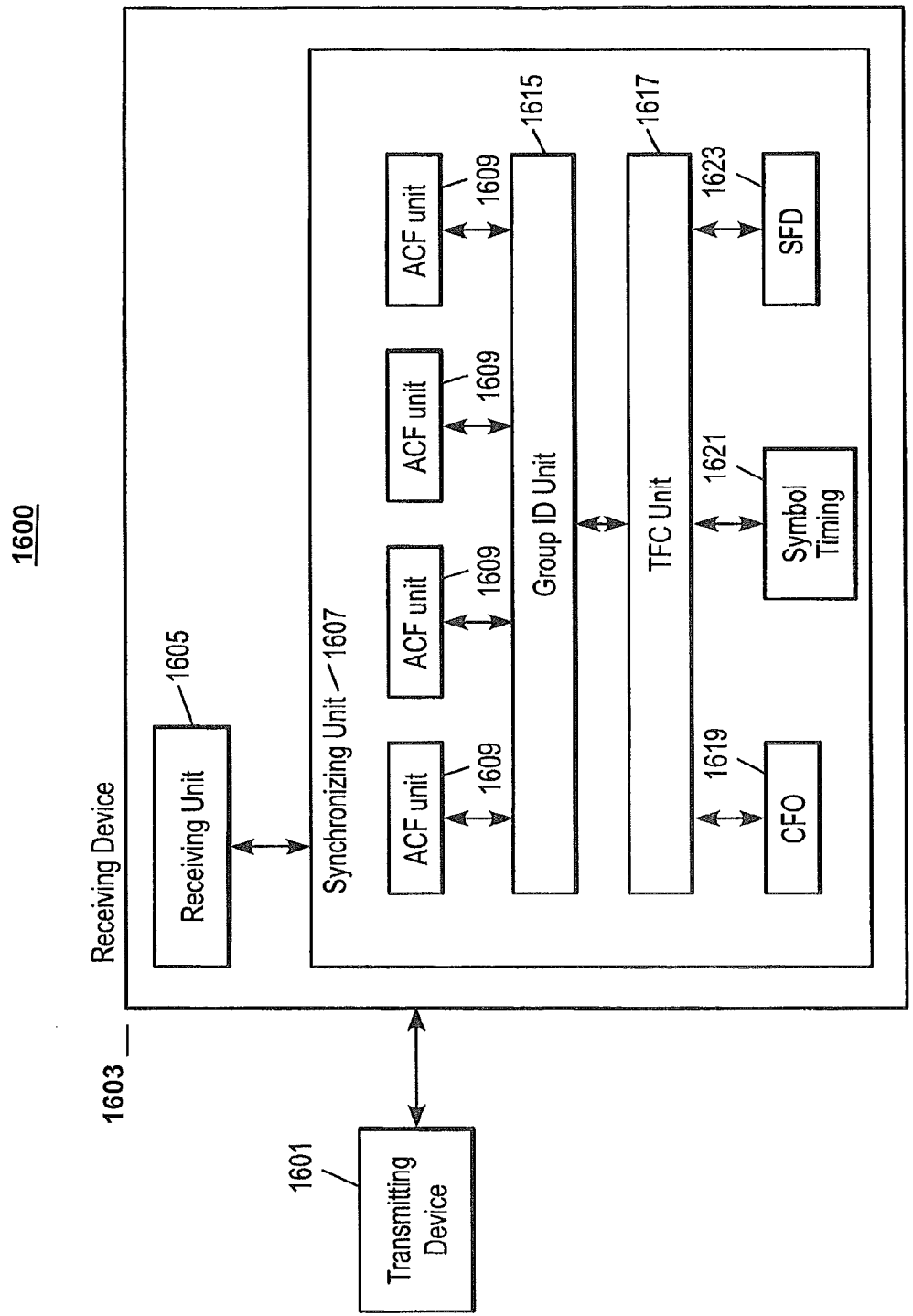
FIG. 16 illustrates an exemplary embodiment of a synchronization system.

As described above, power consumption and complexity of solutions for synchronization can be an issue for applications involving mobile/portable devices, such as applications of MB-OFDM UWB based systems. One technique for synchronizing includes computing, in parallel, autocorrelation values of the signal received in a selected frequency sub-band at a plurality of symbol delays. The signal is transmitted according to one of a plurality of frequency hopping patterns, each of the frequency hopping patterns defining a sequence of frequency sub-bands. The plurality of frequency hopping patterns are partitioned into a plurality of disjoint groups, each group having a different associated periodicity. One of the plurality of groups of frequency hopping patterns is selected based on the autocorrelation values computed in parallel at the plurality of symbol delays. A hopping pattern within the selected group is then identified, and the frequency hopped packets are synchronized accordingly.

An exemplary implementation of the synchronization technique can be in an MB-OFDM UWB based systems. An industrial alliance, WiMedia, has published a series of standards based on the MB-OFDM UWB technology, the contents of which are herein incorporated by reference in their entireties. The Physical/MAC layer specification was accepted as an international standard, ECMA-368, entitled "High Rate Ultra Wideband PHY and MAC Standard," the contents of which are herein incorporated by reference in their entireties. In this example, a packet is made up of multiple symbols transmitted in three sub-bands, each sub-band having a different center frequency. The symbols are transmitted in the frequency sub-bands in accordance with a frequency hopping pattern, known as time-frequency code (TFC). Each frequency hopping pattern defines a sequence of frequency sub-bands. In the preamble of each packet, symbols are transmitted in the different frequency sub-bands in accordance with the sequence defined by the TFC.

Please note that, with the flow charts illustrated in the various figures, not all the operations are required to occur in the order shown in the figures, as will be apparent to persons skilled in the relevant art based on the teachings herein. Other operational and structural embodiments will be apparent to persons skilled in the relevant art based on the following discussion.

Although the embodiments of the present disclosure for synchronizing described below are partially based on the MB-OFDM standard (or ECMA-316), it should be noted that these techniques can also be adapted to other packet-based transmission schemes that use frequency hopping. Depending on the scheme, the number of frequency sub-bands employed by the frequency hopping pattern, the number of frequency hopping patterns and the number of groups of frequency hopping patterns, can be different from these numbers provided in the exemplary embodiments. The explanation will be by way of exemplary embodiments to which the present disclosure is not limited.

Receiver

FIG. 1 is a block diagram of an example of a receiver. The receiver includes a low-noise amplifier (LNA) 110, a low pass filter (LPF) 112, a variable gain amplifier (VGA) 114, an analog-to-digital converter (ADC) 116, an automatic gain control (AGC) 118, a radio frequency (RF) band control 120, a synchronization (SYNC) block 500, and functional blocks such as the Fast Fourier Transform (FFT), channel estimation, and equalizer, as shown in block 126, a de-interleaver, as shown in block 122, and decoders, as shown in block 124.

The LNA 110 receives signals from an antenna 108. The received signals are first down-converted by the RF front end, to analog baseband signals. The analog baseband signal is then converted to digital samples 101 with a sampling interval of T (e.g., 1/528 micro-second). The digital signals 101 are fed into the SYNC block 500 and the other blocks in the demodulation path including FFT, channel estimation and equalization, as shown in block 126. The SYNC block 500 controls the band selection circuit of the RF front end. The SYNC 500 also generates control signals 555, used by other functional blocks, such as the FFT, channel estimation, as shown in block 126, and de-interleaver, as shown in block 122.

Synchronization Performed by the Receiver

FIG. 2 illustrates an example of synchronization performed by the receiver. In FIG. 2, once the receiver is enabled, the synchronization block will first try to detect the preamble signal, as shown in block 600. Since the TFC is unknown to the receiver at this stage, the synchronization block must be able to detect the signal without frequency hopping. After detecting the preamble signals, the receiver attempts to identify the transmitted TFC, as shown in block 700. Thus, in a related art MB-OFDM receiver, the receiver initially determines that a valid packet is being received, and then determines the TFC used by the transmitter. Following the TFC identification, several tasks can be carried out concurrently. These tasks include symbol timing estimation, as shown in block 800, carrier frequency offset (CFO) estimation, as shown in block 900 and start of frame delimiter (SFD) detection, as shown in block 1000. The receiver exits the synchronization when the SFD is detected and starts the ensuing tasks, such as channel estimation and data demodulation.

Packet Structure

FIG. 3 illustrates an example of a structure of an MB-OFDM UWB packet. The MB-OFDM UWB packet 200 consists of three sections: physical layer convergence procedure (PLCP) preamble 201, PLCP header 202, and PLCP service data unit (PSDU) 203.

The PLCP preamble 201 consists of 30 OFDM symbols, s1 to s30. The PLCP preamble 201 can be divided in two sections: packet/frame synchronization sequence 220 and channel estimation sequence 230. The packet/frame synchronization sequence 220 includes symbols s1 through s24, a sequence of 24 synchronization symbols 222. The channel estimation sequence 230 includes symbols s25 through s30, a sequence of six channel estimation symbols 231. Each symbol includes 165 samples at 528 MHz sampling frequency. Of the 165 samples in a symbol, 128 samples are outputs of a 128-point Inverse Fourier Transform (IFFT), 32 samples are zero padding and an additional 5 samples of zeros form a guard interval to allow RF band switching.

Frequency Hopping

FIG. 4 illustrates an example of transmitting RF signals in accordance with a hopping pattern. In FIG. 4, the OFDM symbols 301 are transmitted over three sub-bands: band-1 311 with a center frequency of 3.432 GHz, band-2 312 with a center frequency of 3.960 GHz and band-3 313 with a center frequency of 4.488 GHz. The symbols 301 are transmitted in a repetitive pattern defined by a TFC. The time interval between frequency shifts, or hops, is 312.5 nanosecond. In the example, the transmitted TFC is TFC-1 and the hopping pattern is [band-1, band-2, band-3, band-1, band-2, band-3, . . . ]. The MB-OFDM standard (or ECMA-316) defines a set of seven hopping patterns shown in the table in FIG. 5.

Referring to FIG. 5, TFC-1 corresponds to the repetitive hopping pattern of [band-1, band-2, band-3, band-1, band-2, band-3, . . . ] for successive transmitted symbols. TFC-2 corresponds to the repetitive hopping pattern of [band-1, band-3, band-2, band-1, band-3, band-2, . . . ]. TFC-3 corresponds to the repetitive hopping pattern of [band-1, band-1, band-2, band-2, band-3, band-3 . . . ]. TFC-4 corresponds to the repetitive hopping pattern of [band-1, band-1, band-3, band-3, band-2, band-2, . . . ]. TFC-5 corresponds to the repetitive pattern of [band-1, band-1, band-1, band-1, band-1, band-1 . . . ]. TFC-6 corresponds to the repetitive pattern of [band-2, band-2, band-2, band-2, band-2, band-2, . . . ]. TFC-7 corresponds to the repetitive pattern of [band-3, band-3, band-3, band-3, band-3, band-3, . . . ]. Cross-Correlation Function (CCF) and Auto-Correlation Function (ACF) CCF and ACF functions are known to be used in synchronization design. CCF based synchronization designs compare the incoming signals to known, predefined patterns to determine if a synchronization symbol has been received. The complexity of CCF based synchronization is high for some signals. In the case of MB-OFDM UWB signals, a system based on CCF requires 256 multipliers and 512 adders.

ACF based synchronization designs can be used when the incoming signal is periodic in nature. ACF can be expressed as:

$$ACF_{p,N}(m) = \sum_{l=0}^{K-1} r(m-l) \cdot r^*(m-l-pN) \quad (1)$$

Referring to FIG. 6 and Equation 1, r(m) is the received digital signal, p is the number of delays of synchronization symbol, and N is the number of time domain samples in a symbol. Thus, p*N is the total delay in units of samples. ( )* is a complex conjugation operator. Therefore, Equation (1) defines the ACF of the current symbol with the $p^{th}$ earlier symbol. For example, if p=3, then $ACF_{3N}(m)$ is the ACF of the current preamble symbol and the one three symbols earlier. K is the total number of samples integrated. Exemplary values of K can be 128 or 160.

For efficient implementation, Equation (1) can be rewritten in a recursive form as follows:

$$ACF_{p,N}(m) = ACF(m-1) + r(m) \cdot r^*(m-pN) - r(m-K) \cdot r^*(m-K-pN)$$

FIG. 6 is a block diagram of an example of a conventional ACF implementation. Referring to FIG. 6, r(m) is the received digital signal 401. The hardware components required include one complex multiplier 410, two complex adders 420 and delay elements with delays 444, 445 and 446 of pN, K and 1 sample, respectively. $ACF_{PN}(m)$ 402 corresponds to the ACF of the current symbol with the $p^{th}$ earlier symbol. Note a conjugation operator 409 can be merged with the complex multiplier 410 and incurs no hardware cost.

An ACF based design can be implemented efficiently in hardware. However, ACF can not distinguish different signals with the same periodicity, and therefore additional steps are needed to achieve synchronization.

Detecting and synchronizing to frequency hopped packets depending on a correlation metric of two received preamble symbols are disclosed in U.S. Patent Application Publication No. 2007/0211785 (published Sep. 13, 2007), the contents of which are herein incorporated by reference in their entireties.

Parallel ACF Based Synchronization

FIGS. 7 and 22 are high level block diagrams of exemplary embodiments of a synchronization design based on parallel ACF structures.

Referring to FIGS. 7 and 22, a four parallel-ACF structure 510 has an input r(m) that is propagated through a delay line 515. In the examples of FIGS. 7 and 22, the delay line 515 indicates symbol delays rather than sample delays. In FIG. 7, a first ACF 511 produces an output A that indicates the correlation between the most recent symbol in input r(m), at position 0 in the delay line 515, and the immediately preceding symbol at position 1, i.e. a symbol delay of 1. A second ACF produces an output B that indicates the correlation of the symbols at positions 0 and 2. A third ACF produces an output C that indicates the correlation of the symbols at positions 0 and 3. A fourth ACF produces an output D that indicates the correlation of the symbols at positions 0 and 6. In FIG. 22, a first ACF 511 produces an output A that indicates the correlation between the most recent symbol in input r(m), at position 0 in the delay line 515, and the immediately preceding symbol at position 1, i.e. a symbol delay of 1. A second ACF produces an output B that indicates the correlation of the symbols at positions 0 and 3. A third ACF produces an output C that indicates the correlation of the symbols at positions 0 and 5. A fourth ACF produces an output D that indicates the correlation of the symbols at positions 0 and 6.

In FIGS. 7 and 22, the four ACF outputs, ACF output value A, ACF output value B, ACF output value C and ACF output value D can be aggregated as a bus vector to form parallel ACF output 520.

The parallel ACF output 520 is provided to functional blocks including synchronization symbol detection and TF group identification 600, TFC identification 700, CFO estimation 900, symbol timing 800 and SFD detection 1000. Functions relating to each individual block are described in detail subsequently.

The ACF value A, ACF value B, ACF value C and ACF value D can be expressed by Equations 3, 4, 5 and 6, respectively:

$$A(m)=ACF_{p1,N}(m)=ACF_{p1,N}(m-1)+ r(m)r^*(m-p1N)-r(m-K)r^*(m-K-p1N) \quad (3)$$

$$B(m)=ACF_{p2,N}(m)=ACF_{p2,N}(m-1)+ r(m)r^*(m-p2N)-r(m-K)r^*(m-K-p2N) \quad (4)$$

$$C(m)=ACF_{p3,N}(m)=ACF_{p3,N}(m-1)+ r(m)r^*(m-p3N)-r(m-K)r^*(m-K-p3N) \quad (5)$$

$$D(m)=ACF_{p4,N}(m)=ACF_{p4,N}(m-1)+ r(m)r^*(m-p4N)-r(m-K)r^*(m-K-p4N) \quad (6)$$

In Equations 3, 4, 5 and 6, p1, p2, p3 and p4 are symbol delays. As illustrated in FIG. 7, an example of symbol delays can be 1, 2, 3, 6 for p1, p2, p3 and p4, respectively. As illustrated in FIG. 22, another example of symbol delays can be 1, 3, 5, 6 for p1, p2, p3 and p4, respectively. The symbol r(m) is the received digital signal. N is the number of time domain samples in a symbol. ( )* is a complex conjugation operator. K is the total number of samples integrated. Therefore, Equations (3), (4), (5) and (6) define the ACF of the current symbol with the p1, p2, p3 and p4 earlier symbol, respectively.

The symbol delays are chosen according to Equation (7):

$$p_k \cdot N = \sum_{j=1}^{k} q_j \quad (7)$$

where $k \in \{1, 2, 3, 4\}$, $q_1=p1-0$, $q_2=p2-p1$, $q_3=p3-p2$, $q_4=p4-p3$ and N is the number of samples in one symbol period (e.g., 165 at 528 MHz sampling rate).

Referring to FIGS. 7 and 22, the synchronization detection and TF group identification are carried out in block 600, which detects the presence of preamble symbols and also identifies the TF group simultaneously. Block 600 uses the parallel ACF output 520. Functions relating to block 600 are described in detail subsequently.

FIG. 8 illustrates an exemplary embodiment of a synchronization unit based on parallel ACF structures. In FIG. 8, a four parallel ACF 510 takes input r(m) 101. Four delay units 540, 541, 542, 543 delay their inputs by $q_1$, $q_2$, $q_3$ and $q_4$ symbols in a sequence.

FIG. 9 illustrates an exemplary pattern generation of a synchronization design based on the parallel ACF structures. In FIG. 9, a binary 4-bit pattern is first generated based on the ACF value A, ACF value B, ACF value C and ACF value D. The absolute value (abs) or the magnitude of the real part of the complex outputs of ACF value A, ACF value B, ACF value C and ACF value D are compared to a threshold 601 to generate a 4-bit binary output pattern $[A_b B_b C_b D_b]$ 602.

FIG. 10 illustrates an exemplary embodiment of TF groups, i.e., TGRPs and their corresponding generated patterns for a synchronization design based on parallel ACF structures with symbol delays of 1, 2, 3 and 6.

Each TF group has an associated periodicity that is unique. For example, TFC-1 corresponds to the repetitive hopping pattern of [band-1, band-2, band-3, band-1, band-2, band-3, ...] of the transmitted symbols. TFC-2 corresponds to the repetitive hopping pattern of [band-1, band-3, band-2, band-1, band-3, band-2, ...]. Thus, TFC-1 and TFC-2 transmit a symbol once in a given frequency sub-band before transmitting the symbol in a different frequency sub-band. Accordingly, for TFC-1 and TFC-2, the 4-bit binary output pattern $[A_b B_b C_b D_b]$ 620 for symbol delays [1 2 3 6] is [0 0 1 1]. In other words, in a given sub-band, a received symbol does not correlate to the first or second preceding symbols. However, it does correlate to the preceding third and sixth symbols.

TFC-3 corresponds to the repetitive hopping pattern of [band-1, band-1, band-2, band-2, band-3, band-3, ...]. TFC-4 corresponds to the repetitive hopping pattern of [band-1, band-1, band-3, band-3, band-2, band-2, ...]. Thus, TFC-3 and TFC-4 transmit a symbol twice in one frequency sub-band before transmitting the symbol in a different frequency sub-band. Accordingly, for TFC-3 and TFC-4, the 4-bit binary output pattern $[A_b B_b C_b D_b]$ 620 for symbol delays [1 2 3 6] is [1 0 0 1], i.e. a received symbol correlates to the preceding first and sixth symbols.

TFC-5 corresponds to the repetitive hopping pattern of [band-1, band-1, band-1, band-1, band-1, band-1, ...]. TFC-6 corresponds to the repetitive hopping pattern of [band-2, band-2, band-2, band-2, band-2, band-2, ...]. TFC-7 corresponds to the repetitive hopping pattern of [band-3, band-3, band-3, band-3, band-3, band-3, ...]. Thus, TFC-5, TFC-6 and TFC-7 transmit a symbol in a single frequency sub-band, i.e. there is no hopping. Accordingly, for TFC-5, TFC-6 and TFC-7, the 4-bit binary output pattern $[A_b B_b C_b D_b]$ 620 for symbol delays [1 2 3 6] is [1 1 1 1].

Referring to FIG. 9, the binary output pattern $[A_b B_b C_b D_b]$ 602 is compared to the bit patterns of the groups of TFCs, as shown in FIG. 10. If a matching pattern is detected, the TF group can be determined accordingly.

FIG. 23 illustrates an exemplary embodiment of TF groups, i.e., TGRPs and their corresponding generated patterns for a synchronization design based on parallel ACF structures with symbol delays of 1, 3, 5 and 6.

For TFC-1 and TFC-2, the 4-bit binary output pattern $[A_b B_b C_b D_b]$ 620 for symbol delays [1 3 5 6] is [0 1 0 1]. In other words, in a given sub-band, a received symbol does not correlate to the first or fifth preceding symbols. However, it does correlate to the preceding third and sixth symbols.

For TFC-3 and TFC-4, the 4-bit binary output pattern $[A_b B_b C_b D_b]$ 620 for symbol delays [1 3 5 6] is [0 0 1 1] or [1 0 0 1].

For TFC-5, TFC-6 and TFC-7, the 4-bit binary output pattern $[A_b B_b C_b D_b]$ 620 for symbol delays [1 2 3 6] is [1 1 1 1].

Referring to FIG. 9, the binary output pattern $[A_b B_b C_b D_b]$ 602 is compared to the bit patterns of the groups of TFCs, as shown in FIG. 23. If a matching pattern is detected, the TF group can be determined accordingly.

FIG. 11 is a flow chart illustrating an exemplary embodiment of symbol detection and TFC group identification. In the decision block 1102, if the received pattern matches a known pattern, the synchronization symbol is detected, and the TF group is identified based on the pattern. The synchronization enters the state of sync-detected 1103.

FIG. 12 is a flow chart illustrating an exemplary embodiment of TFC identification. Once the synchronization enters the state of sync-detected 610, it is determined whether the TGRP is 3, as shown in the decision block 1202. If the TGRP is 3, the TFC is identified based on the current RF band information. As described previously, TFC-5 corresponds to the repetitive hopping pattern of [band-1 band-1 band-1 band-1 band-1 band-1 . . . ]. TFC-6 corresponds to the repetitive hopping pattern of [band-2 band-2 band-2 band-2 band-2 band-2 . . . ]. TFC-7 corresponds to the repetitive hopping pattern of [band-3 band-3 band-3 band-3 band-3 band-3 . . . ]. Therefore, if the current RF band is band 1, TFC-5 is identified. If the current RF band is band 2, TFC-6 is identified. If the current RF band is band 3, TFC-7 is identified.

If the identified TF group is other than 3, the process flow switches to a different band, as shown in block 1204, and evaluates the values of one of the ACF outputs 511, 512, 513 and 514 at two time instances when the ACF output peak values are predicted to determine the TFC. The new RF band is chosen based on the current RF band and the detected TF group. Based on the identified TGRP and the peak position of the ACFs, the process flow switches to a band where the peak value of a selected ACF output should occur at different symbol period for different TFC. The receiver compares the peak values at these two time instances and determines the TFC, as shown in blocks 1206 and 1208. Once the TFC is identified, SFD synchronization starts, as shown in block 1210. It is possible to add additional signal processing of the ACF outputs to improve the robustness of the performance instead of using just ACF outputs at two instances.

FIG. 13 illustrates an example of TFC identification for a synchronization design based on parallel ACF structures with symbol delays of 1, 2, 3 and 6. The signal is received in band-1 initially. The binary 4-bit pattern 602 is detected as [0 0 1 1], which matches the pattern for TGRP-1. The receiver then switches to band-2. With TGRP-1, the values of ACF value A output 511 and values of ACF value B output 512 cannot be used to distinguish TFC-1 from TFC-2 since neither TFC-1 nor TFC-2 produces ACF values that exceed the threshold 601 in these outputs. The value of ACF value C output 513 is used to distinguish TFC-1 from TFC-2, because the values of ACF value C output 513 would be different for TFC-1 and TFC-2. For example, to identify the TFC in TGRP-1, the values of ACF value C output 513 at t4 and t5 are compared, where t0 703 is when the receiver is first switched to a different frequency sub-band, t4 is four symbol periods after t0 and t5 is five symbol periods after t0. If the first value 701 is greater than the second value 702, TFC-1 is identified. If the first value 701 is less than the second value 702, TFC-2 is identified.

Figure 17:
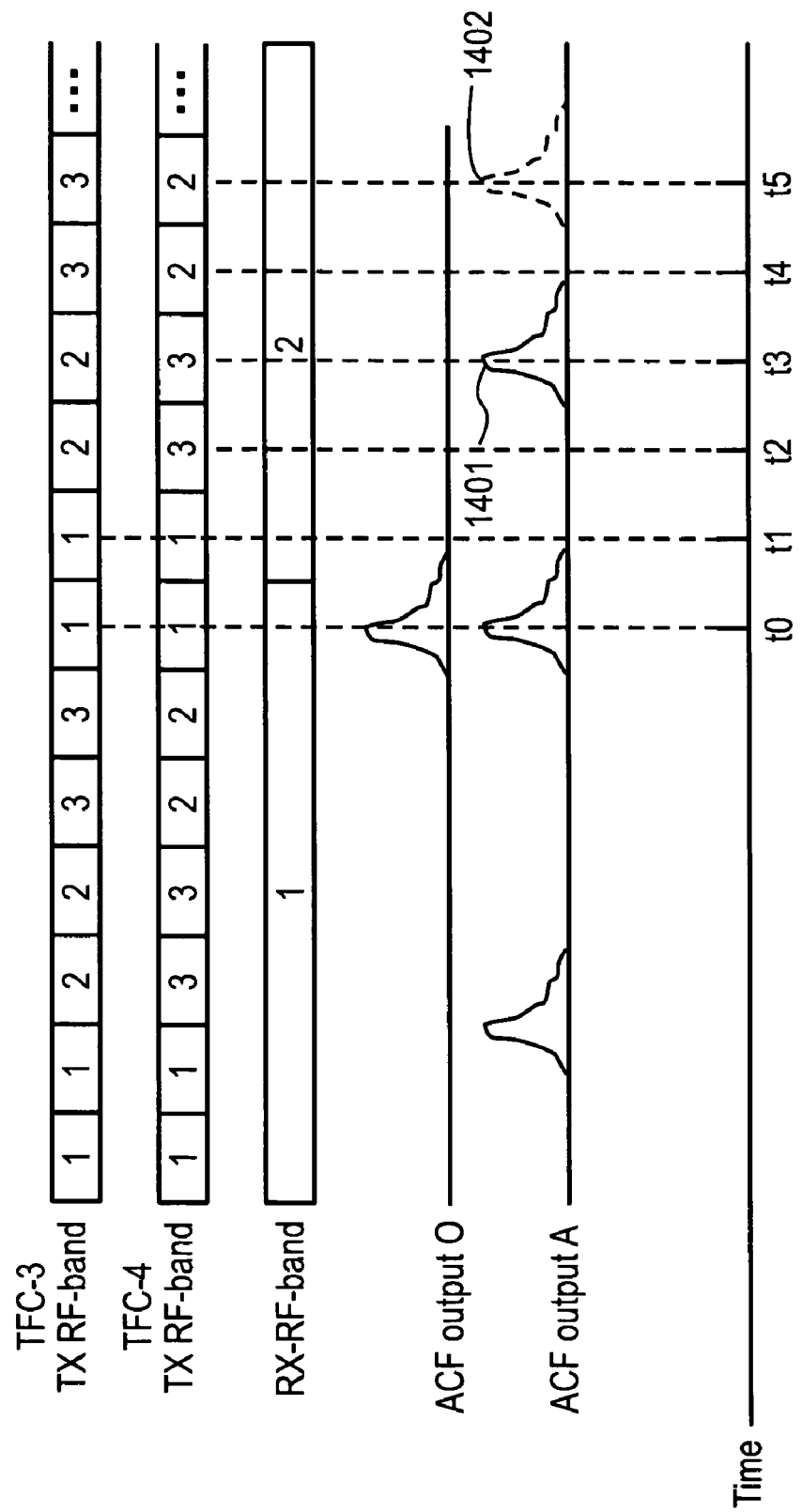
FIG. 17 illustrates another example of TFC identification.

FIG. 17 illustrates another example of TFC identification for a synchronization design based on parallel ACF structures with symbol delays of 1, 2, 3 and 6. The signal is received in band-1 initially. The binary 4-bit pattern 602 for symbol delays [1 2 3 6] is detected as [1 0 0 1], which matches the pattern for TGRP-2. The receiver then switches to band-2. With TGRP-2, the values of ACF value B output 512 and values of ACF value C output 513 cannot be used to distinguish TFC-3 from TFC-4 since neither TFC-3 nor TFC-4 produces ACF values that exceed the threshold 601. The value of ACF value A output 511 is used to distinguish TFC-3 from TFC-4, because the values of ACF value A output 511 would be different for TFC-3 and TFC-4. For example, to identify the TFC in TGRP-2, the values of ACF value A output 511 at t3 and t5 are compared, where t0 is when the receiver is first switched to a different frequency sub-band, t3 is three symbol periods after t0 and t5 is five symbol periods after t0. If the first value 1401 at t3 is greater than the second value 1402 at t5, TFC-3 is identified. If the first value 1401 at t3 is less than the second value 1402 at t5, TFC-4 is identified.

FIG. 24 illustrates an example of TFC identification for a synchronization design based on parallel ACF structures with symbol delays of 1, 3, 5 and 6. The signal is received in band-1 initially. The binary 4-bit pattern 602 for symbol delays [1 3 5 6] is detected as [0 1 0 1], which matches the pattern for TGRP-1. The receiver then switches to band-2. With TGRP-1, the values of ACF value A output 511 and values of ACF value C output 513 cannot be used to distinguish TFC-1 from TFC-2 since neither TFC-1 nor TFC-2 produces ACF values that exceed the threshold 601. The value of ACF value B output 512 is used to distinguish TFC-1 from TFC-2, because the values of ACF value B output 512 would be different for TFC-1 and TFC-2. For example, to identify the TFC in TGRP-1, the values of ACF value B output 512 at t4 and t5 are compared, where t0 is when the receiver is first switched to a different frequency sub-band, t4 is four symbol periods after t0 and t5 is five symbol periods after t0. If the first value 2401 at t4 is greater than the second value 2402 at t5, TFC-1 is identified. If the first value 2401 at t4 is less than the second value 2402 at t5, TFC-2 is identified.

Once the receiver identifies the TFC code, it proceeds to accomplish other functions including CFO estimation, FFT timing search and SFD detection.

Although the exemplary embodiments of TF group and TFC identifications have been described are partially based on ECMA-316, it should be noted that these techniques can also be adapted to other packet-based transmission schemes that use frequency hopping. Depending on the scheme, the number of frequency sub-bands employed by the frequency hopping pattern, the groups of frequency hopping patterns, and the frequency hopping patterns can be different from these provided in the exemplary embodiments. The explanation is by way of exemplary embodiments to which the present disclosure is not limited.

Parallel ACF based Technique—Symbol Timing

Once the TFC is identified, the symbol timing can be optimized. This optimization includes determining which received samples should be processed by the FFT, essentially the receiver windows screen the incoming sample and choose a contiguous set of samples for processing.

The receiver determines the optimal symbol timing based on the peak location of one or more of the ACF value A output 511, ACF value B output 512, ACF value C output 513 and ACF value D output 514, on one or more bands. The selection of ACF output is TFC code dependent because of the following reasons:

(1) for some TFC codes, certain ACF outputs do not produce valid peak values;

(2) for a channel with a long delay spread, certain ACF outputs have very low peak to average ratio, which makes the symbol timing less accurate and more noise sensitive.

For example, if TFC-1 has been detected, according to FIG. 10, ACF value C output 513 and ACF value D output 514 are producing valid ACF measurements, e.g., producing ACF measurements that exceed the threshold 601. In this case, the ACF value C output 513 is generating $ACF_{3N}(m)$, and the ACF value D output 514 is generating $ACF_{6N}(m)$. The symbol timing block finds the optimal window location for the ensuing frequency domain operations. The optimal window maximizes the signal to interference and noise ratio (SINR) in the FFT window defined as follows:

$$d_{opt} = \underset{d}{\operatorname{argmax}}\left\{\frac{\sigma_s^2}{\sigma_{ICI}^2 + \sigma_v^2}\right\} \quad (8)$$

where $\sigma_s^2$ is the signal power in an FFT window and $\sigma_{ICI}^2$ is the inter-carrier-interference (ICI) power and $\sigma_v^2$ is the noise power.

The optimal window timing can be approximated as the peak position of an ACF output defined as follows:

$$\hat{d}_{opt} = \underset{d}{\operatorname{argmax}}\{ACF_{P,N}(d)\} \quad (9)$$

where the maximization is assumed to take place over the sample delay, d, of the ACF which produces a valid peak. In other words, the symbol timing block finds the largest ACF value over the four input signals, the ACF value A output 511, ACF value B output 512, ACF value C output 513 and ACF value D output 514, and returns the sample delay, $d_{opt}$, where this peak occurs. Therefore, the searching for the optimal symbol timing is performed by searching for the sample position where an ACF output 520 produces a peak value.

Since there can be multiple ACFs producing valid measurements, the symbol timing estimate can be improved by performing the searching over multiple ACF outputs.

The methods of combining multiple ACF outputs include, but are not limited to the following examples:

Example 1

An example is to search for a peak over all valid ACF outputs. The optimal timing is expressed as:

$$\hat{d}_{opt} = \underset{p,d}{\operatorname{argmax}}\{ACF_{P,N}(d)\} \quad (10)$$

where the maximization is assumed to take place over both the symbol delay, p, and the sample delay, d. In other words, the symbol timing block finds the largest ACF value over the four input signals, the ACF value A output 511, ACF value B output 512, ACF value C output 513 and ACF value D output 514, and returns the sample delay, $d_{opt}$, where this peak occurs.

Example 2

Another example is to use the average of ACF outputs to reduce the effect of noise on the ACF outputs. All the ACF outputs can be noisy since the received signal can be corrupted by additive Gaussian noise as well as ICI. Thus the location of any detected peak may differ from the actual true peak due to signal distortions and noise. From the TFC identification procedure, the receiver has knowledge about which ACF outputs are producing valid measurements. In this example, the receiver first averages all the valid ACF outputs, then searches for the timing points over the averaged results for the sample point where the peak is produced. The process is expressed by the following two equations:

$$ACF_{avg}(d) = \frac{1}{M}\sum_{P \in Sv} ACF_{P,N}(d) \quad (11)$$

where M is the total number of ACFs that produce valid outputs and Sv is the set of symbol delays, p, of the valid ACFs, and $$\hat{d}_{opt} = \underset{d}{\operatorname{argmax}}\{ACF_{avg}(d)\} \quad (12)$$

Example 3

This example also uses averaging to reduce the effect of noise on the ACF outputs. In this case, the receiver first computes to find the location of the peak on each of the valid ACF outputs, and then averages these locations to generate its estimate of the peak location. Mathematically, the receiver produces a vector of peak location estimates according to the following equations:

$$d_p = \underset{d}{\operatorname{argmax}}\{ACF_{P,N}(d)\}, \quad (13)$$

for all $p \in Sv$. The receiver averages all the values of $d_p$ to produce an estimate of the location peak, $d_{opt}$ $$\hat{d}_{opt} = \operatorname{round}\left(\frac{1}{sizeof(d_p)}\sum d_p\right) \quad (14)$$

Please note that the methods of combining multiple ACF outputs are not limited to these examples provided above.

Parallel ACF Based Technique—Estimating CFO

In an UWB system, the local oscillators of the devices are generally free running and the CFO must be dealt with to ensure the performance. The CFO can be estimated by the synchronization logic directly using the ACF outputs as $$\Delta\hat{f} = \frac{\operatorname{angle}(ACF_{P,N}(n))}{2\pi pNT}. \quad (15)$$

A larger p results in a more accurate estimate. However, a large p may introduce phase ambiguity.

The received RF signal can be considered as a baseband signal $r_0(t)$ modulated by the transmitted carrier at center frequency of $f_{TX}$ as follows:

$$r_{RF}(t) = r_0(t)\exp(j2\pi f_{TX}t + \theta_0) \quad (16)$$

If the receiver demodulates the signal using a different RF center frequency $f_{RX}$, the demodulated signal after an LPF seen by the receiver is $$r(t) = r_0(t)\exp(j2\pi(f_{TX}-f_{RX})t+\theta_0) = r_0(t)\exp(j2\pi\Delta ft+\theta_0) \quad (17)$$

and in the discrete domain $$r(m) = r_0(m)\exp(j2\pi\Delta fmT+\theta_0) \quad (18)$$

where $\Delta f = f_{TX} - f_{RX}$ is the CFO and $\theta_0$ is a constant phase rotation.

If transmitter and receiver clocks are perfectly synchronized (i.e., $\Delta f = 0$), the ACF output can be expressed as $$ACF_{P,N}^0(m) = \sum_{l=0}^{K-1} r_0(m-l) \cdot r_0^*(m-l-pN) \quad (19)$$

where $r_0(m)$ and $r_0(m-pN)$ are samples separated by p symbol delays. For noise-free preamble signals, it can be assumed that $r_0(m)=r_0(m-pN,)$ and therefore $ACF^0_{p,N}(m)$ is a real number.

When $\Delta f$ is non-zero, the ACF output is computed as:

$$\begin{aligned}ACF_{P,N}(m) &= \sum_{l=0}^{K-1} r(m-l) \cdot r^*(m-l-pN) \quad (20)\\
&= \sum_{l=0}^{K-1} r_0(m-l)\exp(j2\pi\Delta f(m-l)T+\theta_0) \cdot\\
&\quad r_0^*(m-l-pN)\exp(-j2\pi\Delta f(m-l-pN)T-\theta_0)\\
&= \sum_{l=0}^{K-1} r_0(m-l)r_0^*(m-l-pN)\exp(j2\pi\Delta f(pN)T)\\
&= \exp(j2\pi\Delta f(pN)T)\sum_{l=0}^{K-1} r_0(m-l)r_0^*(m-l-pN)\\
&= \exp(j2\pi\Delta f(pN)T)ACF_{P,N}^0(m)\end{aligned}$$

Since $ACF^0_{p,N}(m)$ is a real number, $ACF_{p,N}(m)$ is a complex number and its angle is determined as $$\theta_s(p) = \angle(ACF_{p,N}(m)) = 2\pi\Delta f pNT. \quad (21)$$

where N=165 is the number of samples in a symbol, T=1/528 MHz=$1.8939 \times 10^{-9}$ second is the sampling rate, and $\angle$ is the phase operator. Both N and T are constant.

Equation (21) shows that for a fixed $\Delta f$, $\theta_s(p)/\theta_s(q)=p/q$. In other words, the phase of the noise-free ACF output vectors is proportional to the symbol delays of the ACFs.

Equation (21) corresponds to the noise-free vector angle. If the noise at the receiver is included, the phase of the ACF output is $$\theta_r(p) = \angle(ACF_{p,N}(m)) = 2\pi\Delta f pNT + \theta_n = \theta_s(p) + \theta_n \quad (22)$$

where $\theta_n$ is the phase noise introduced by the total noise at the receiver.

The receiver estimates the carrier frequency offset using $$\Delta f_{est} = \frac{\angle ACF_{p,N}(m)}{2\pi pNT} = \frac{\theta_r(p)}{2\pi pNT} \quad (23)$$

The estimation error is $$\epsilon(\Delta f) = \text{abs}(\Delta f_{est} - \Delta f) = \theta_n/2\pi pNT \quad (24)$$

On one hand, Equations (21) and (22) show that for a given $\Delta f$, a large p will result in a wider angle at the ACF output (large $\theta_s(p)$ or $\theta_r(p)$). On the other hand, for a given phase noise $\theta_n$, the estimation error $\epsilon(\Delta f)$ is reduced when p increases, as shown in Equation (24). To avoid phase ambiguity, the angle, $\theta_s(p)$ must be within $(-\pi/2, +\pi/2)$. Therefore, to estimate $\Delta f$ in a wide range, the outputs of the ACF between signals with small symbol delay should be used. However, to achieve high accuracy, the outputs of the ACF of signals with large symbol delay should be used.

CFO estimation can achieve a higher accuracy and a wider range via a recursive algorithm using the parallel ACF output.

FIG. 14 illustrates an exemplary embodiment of the recursive CFO estimation procedure. In FIG. 14, the CFO estimation process begins after the start of the hopping, as shown in block 1404. p is first initialized to 1 and $\Delta f_{est}$ is initialized to 0, as shown in block 1403. In the initial iteration, $\theta_r(1)$ is computed without ambiguity. The algorithm performs the estimation using multiple ACF outputs. In the first iteration, it performs an CFO estimation using with p set to a small value, for example, 1. In the following iterations, the estimator selects a new $ACF_{p,N}$ with a larger value p, as shown in block 1405. R rotates the $ACF_{p,N}$ vector by an angle that is computed using the estimated CFO ($\Delta f_{est}$) from the previous iteration. The angle of the rotated vector $\theta_{res}$ is normally close to 0. The angle of the rotated $ACF_{p,N}$, $\theta_{res}$ is then estimated, as shown in block 1407, and a new CFO estimation is computed using the estimated CFO prior to the residual phase offset, as shown in block 1409. It is determined whether a maximum number of iterations is reached, as shown in the decision block 1411. If no, the process flow returns to block 1405, Otherwise, the CFO estimator outputs the estimated CFO, $\Delta f_{est}$, as shown in block 1413.

The following is the pseudo-code of the iterative estimation algorithm:

```
Input: ACF_{p,N}(m) for varying p;
Initialization:
   Δf_est = 0;
While (max # of iteration not reached) {
   p = p_next;   // assign a new value to p
   θ_res = (∠ACF_{p,N}(m) * exp(j2πΔf_est pNT)); // angle of rotated vector
   Δf_est = Δf_est + θ_res/2πpNT;   // compute new Δf_est
}
output: Δf_est
```

The recursive procedure stops when a pre-determined number of iterations is reached. A simulation indicates that two iterations with p=[1 6] result in a sufficiently accurate estimation.

The process is illustrated by the following example:

A +100 ppm CFO between transmitter and receiver is assumed (i.e., the transmitter is 100 part per million faster than the receiver). A center frequency $f_c$ of $4 \times 10^9$ Hz is also assumed. The value of $\Delta f$ can be $f_c \cdot CFO = 100 \times 10^{-6} \times 4 \times 10^9 = 4 \times 10^5$ Hz.

Note that N=165, T=1/528 MHz=$1.8939 \times 10^{-9}$ and $f_d = 4 \times 10^5$ Hz. Assuming that the phase errors contributed by noise are $\theta_n = +0.05\pi$ at all the $ACF_{p,N}$ outputs, if p>4, $2\pi\Delta f pNT => \pi$. That is, a phase ambiguity happens. Therefore, $\Delta f$ cannot be recovered directly from $\theta_r(p)$ if p>4 in the ACF output $ACF_{p,N}(m)$.

Assuming the estimator takes 3 iterations using p=1, 3, 6 respectively, the following are the values computed in each iteration:

Initialization:

$$\Delta f_{est} = 0;$$

1$^{st}$ iteration:

$$p = 1;$$

$$\theta_{res} = (\angle ACF_{p,N}(m) \cdot \exp(-j2\pi\Delta f_{est} pNT)) = 0.25\pi + 0.05\pi = 0.3\pi;$$

$$\Delta f_{est} = \Delta f_{est} + 0.3\pi/2\pi NT = 4.8 \times 10^5;$$

2$^{nd}$ iteration:

$$p = 3;$$

$\theta_{res}=(\angle ACF_{3,N}(m)*\exp(-j6\pi\Delta f_{est}NT))=$
    $0.8\pi-0.9\pi=-0.1\pi;$ $\Delta f_{est}=\Delta f_{est}-0.1\pi/(6\pi NT)=4.8\times10^5-0.533\times10^5=$
    $4.267\times10^5;$ $3^{rd}$ iteration:

$p=6;$ $\theta_{res}=(\angle ACF_{6,N}(m)*\exp(-j12\pi\Delta f_{est}NT))=$
    $1.55\pi-1.6\pi=-0.05\pi;$ $\Delta f_{est}=\Delta f_{est}-0.05\pi/(12\pi NT)=4.267\times10^5-0.133\times$
    $10^5=4.133\times10^5;$ output;

$\Delta f_{est}=4.133\times10^5$ Hz;

The estimation error is $\epsilon(\Delta f)=1.33\times10^4$ Hz. Therefore, a higher accuracy and a wider range via a recursive algorithm using the parallel ACF output have been achieved.

Parallel ACF based Technique—Detecting SFD

The PLCP preamble 201 consisting of 24 synchronization symbols is modulated by a cover sequence. The frame synchronization is achieved by the receiver synchronized to the preamble cover sequence. The cover sequence is a 24 element sequence that consists of −1s and +1s.

The $k^{th}$ sample of the $n^{th}$ symbol in the standard PLCP preamble is given by:

$s_{sync,n}[k]=s_{cover}[n]\times s_{ext}[k]$

The cover sequences are different for different TF groups and the SFD detection locates a unique segment of the cover sequence. The SFD can be detected by recovering the entire or a section of the cover sequence.

For the purpose of SFD detection, the signs of the four ACF outputs 520 (at their peak locations) are used. The signs are referred to as polarity patterns. Depending on the TGRP value determined by the TFC identification, the proper polarity pattern is used to compare against the received polarity pattern. If the received polarity patterns match the predefined patterns for several consecutive symbols, the SFD is detected.

The SFD detection indicates the end of the synchronization section in the preamble. Once detected, the receiver exits the synchronization stage and starts the reception of the rest of the packet.

FIG. 15 is a flow chart illustrating an example of STD detection. The SFD detection process begins after the receiver starts hopping, as shown in block 1501.

The cover sequence is [1 1 1 1 1 1 1 1 1 1 1 1 1 1 1 1 1 1 1 1 −1 −1 −1] for TFC-1 and TFC-2. The polarity output patterns are [−1 −1 −1 −1], [−1 −1 −1 −1] and [−1 −1 −1 −1] for the last three symbols received and therefore PAT1=[−1 −1 −1 −1], PAT2=[+1 −1 −1 −1] and PAT3=[+1 +1 −1 −1].

The cover sequence is [1 1 1 1 1 1 1 1 1 1 1 1 1 1 1 1 1 1 1 1 −1 −1 −1] for TFC-3 and TFC-4, Therefore, the values are PAT1=[−1 +1 −1 −1], PAT2=[−1 +1 −1 +1] and PAT3=[−1 +1 −1 −1]

The cover sequence is [−1 −1 −1 −1 −1 −1 −1 −1 1 −1 −1 1 −1 −1 1 1 −1 −1 1 1 −1 1 1 1] for TFC-5, TFC-6 and TFC-7 and therefore the values are PAT1=[+1 +1 −1 −1], PAT2=[+1 −1 +1 +1] and PAT3=[+1 +1 −1 −1].

In block 1503, PAT1, PAT2 and PAT3 are initialized according to the TF group.

In decision blocks 1505, 1507 and 1509, it is determined whether the received polarity patterns match PAT 1, PAT 2 and PAT 3. SFD is detected when matches for PAT 1, PAT 2 and PAT 3 are found.

Exemplary Methods for Synchronizing using Parallel ACF—Synchronization Symbol Detection, TF Group and TFC Identification It should be noted that in accordance with aspects of the present disclosure, the methods for synchronizing can be employed in conjunction with a computer-based system, where the methods can be implemented in hardware, software, firmware, or combinations thereof.

Figure 18:
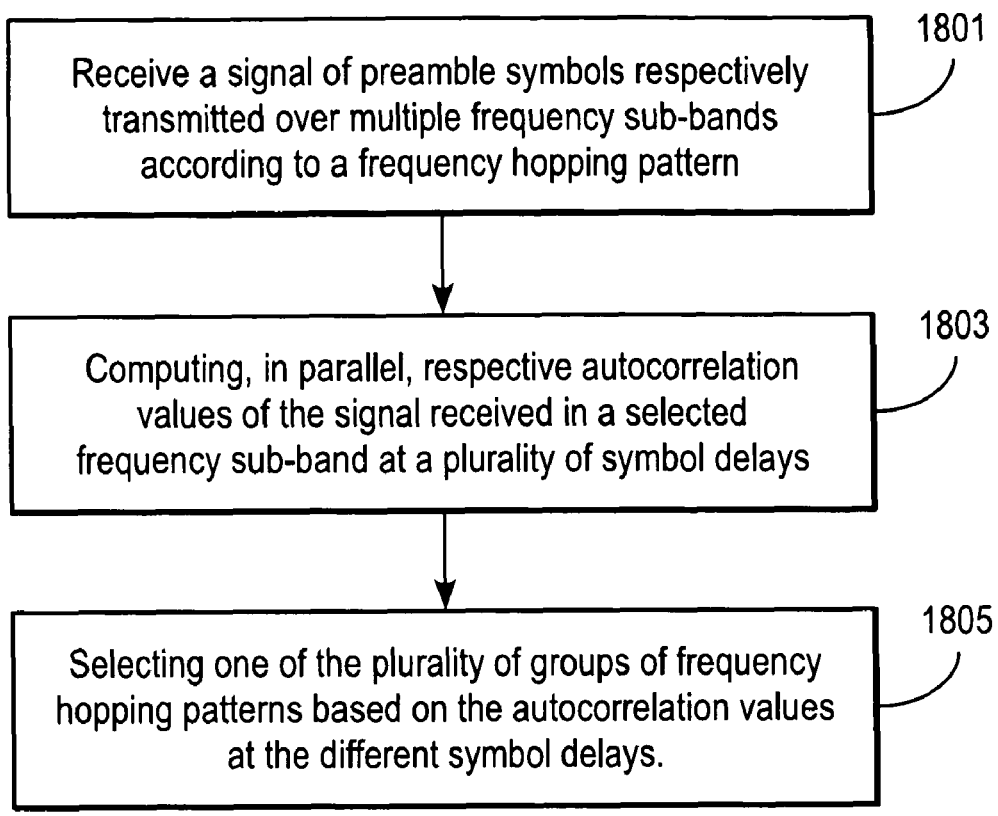
FIG. 18 is a flow chart illustrating an exemplary embodiment of a synchronization method.

FIG. 18 is a flowchart illustrating a method of synchronizing using Parallel ACF. Referring to FIG. 18, in block 1801, a signal of preamble symbols respectively transmitted over a sequence of frequency sub-bands according to one of a plurality of frequency hopping patterns is received. Each frequency hopping pattern defines a sequence of frequency sub-bands. For example, ECMA-316 provides seven frequency hopping patterns, TFC-1 through TFC-7.

The plurality of frequency hopping patterns are partitioned into a plurality of disjoint groups, each group having a different associated periodicity. For example, TFC-1 through TFC-7 are partitioned into three groups, as illustrated in FIG. 10. In accordance with TFC-1 and TFC-2, which belong to group 1, the transmitter switches to a different frequency sub-band after each symbol is transmitted. In accordance with TFC-3 and TFC-4, which belong to group 2, the transmitter switches to a different frequency sub-band after every two symbols are transmitted. In accordance with TFC-5, TFC-6 and TFC-7, which belong to group 3, the transmitter stays in the respective frequency sub-band. As shown in the above example, each group of TFCs is associated with its own periodicity.

In block 1803, respective autocorrelation values of the signal received in a selected frequency sub-band at a plurality of symbol delays are computed in parallel. As described in detail above with reference to FIG. 7, respective autocorrelation values of the signal received in a first frequency sub-band at one, two, three and six symbol delays are computed in parallel. The number of the symbol delays, and the length of the symbol delays can be different from those provided in the examples.

In block 1805, one of the plurality of groups of frequency hopping patterns is selected based on the autocorrelation values at the different symbol delays. Selecting a group of frequency hopping patterns can include generating a binary output by comparing absolute values of the autocorrelation values for each of the different symbol delays to a threshold; the generated binary output for each of the different symbol forming an output pattern; comparing the output pattern to respective patterns of the groups of frequency hopping patterns; and selecting the group of frequency hopping patterns which has a pattern that matches the generated output pattern.

The method can also include an operation that detects presence of preamble symbols simultaneously with selecting the one of the plurality of groups of frequency hopping patterns.

Exemplary embodiments of the synchronization signal detection and the TF group operations are provided above in descriptions with reference to FIGS. 7 and 9-11, where the scheme of frequency hopping patterns is in accordance with ECMA-316.

Figure 19:
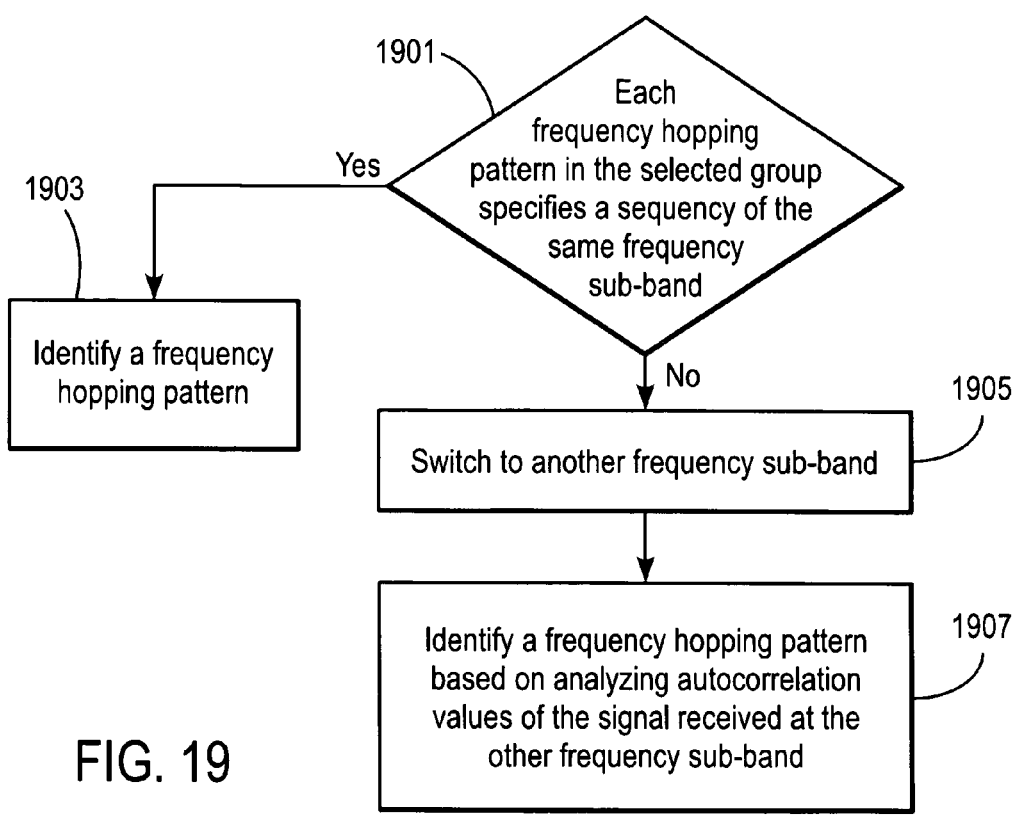
FIG. 19 is a flow chart illustrating an exemplary embodiment of TFC identification.

FIG. 19 is a flow chart illustrating an exemplary method of synchronizing using Parallel ACE Referring to FIG. 19, in decision block 1901, it is determined if each frequency hopping pattern in the selected group of frequency hopping patterns specifies a sequence of the same frequency sub-band. If yes, one of the plurality of frequency hopping patterns is identified based on the selected frequency sub-band, as shown in block 1903. If no, the signal is received at another frequency sub-band, wherein the other frequency sub-band is different from the selected frequency sub-band, as shown in decision block 1905; and one of the frequency hopping patterns is identified based on analyzing autocorrelation values of the signal received in the other frequency sub-band at a selected symbol delays, as shown in block 1907.

The frequency hopping pattern is identified based on a determined symbol period delay between the time of switching to another frequency sub-band and a time when a peak of the autocorrelation values of the signal received in the other frequency sub-band appears for a selected symbol delay. Such symbol delay is selected so that each frequency hopping pattern within the selected group corresponds to a unique symbol period delay. A symbol period delay is determined by comparing peaks of the autocorrelation values of the signal received in the other frequency sub-band at symbol period delays that correspond to frequency hopping patterns within the selected group; and determining symbol period delay based on the largest of the peaks.

Exemplary embodiments of the TFC identification operations are provided above in descriptions with reference to FIGS. 12, 13 and 17, where the scheme of frequency hopping patterns is in accordance with ECMA-316.

Exemplary Methods for Synchronizing using Parallel ACF—Symbol Timing

Figure 20:
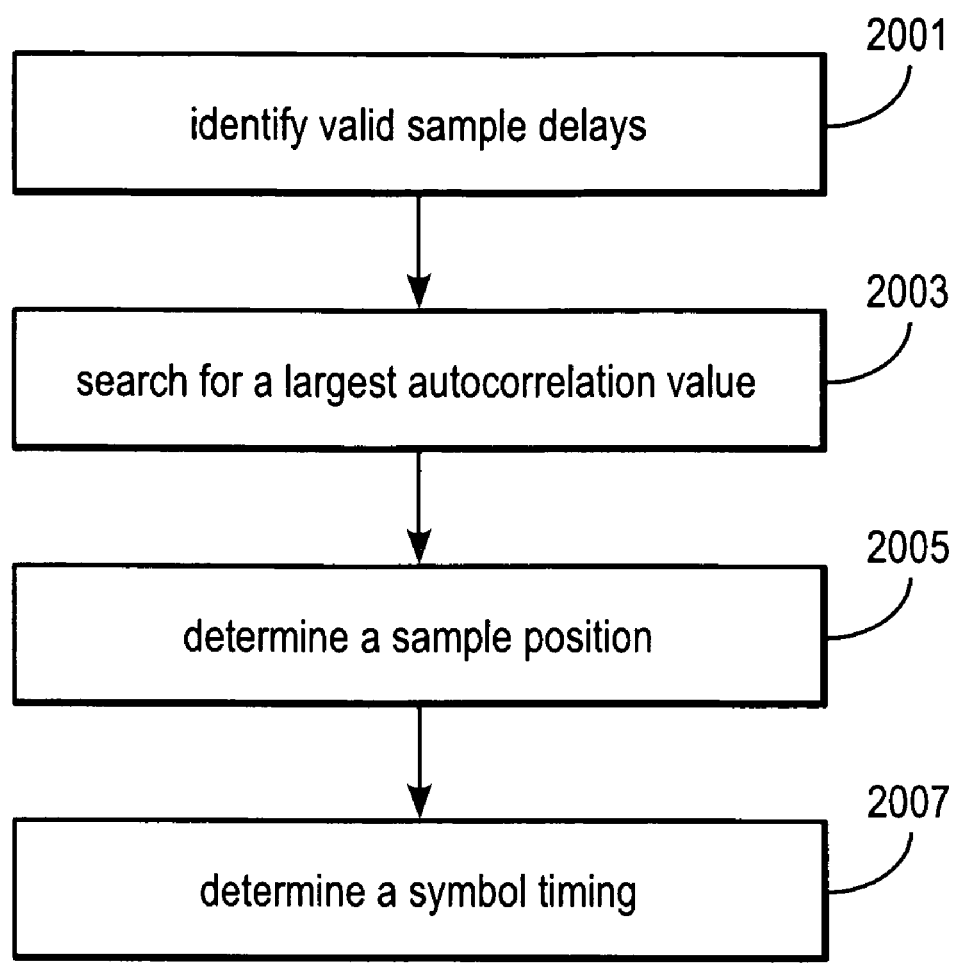
FIG. 20 is a flow chart illustrating an exemplary embodiment of determining symbol timing.

Once the TFC is identified, the symbol timing can be optimized. FIG. 20 illustrates an exemplary method for determining symbol timing by using the parallel ACF. Referring to FIG. 20, in block 2001, valid symbol delays are identified.

Examples of identifying valid symbol delays, e.g. symbol delays that produce autocorrelation values that exceed a threshold, are provided above in descriptions with reference to FIG. 9.

In block 2003, the largest autocorrelation value is identified. There are several examples of how the largest autocorrelation value is identified. For example, identifying the largest autocorrelation value can be performed by searching for the largest autocorrelation value among autocorrelation values at all valid symbol delays; by searching for the largest autocorrelation value among autocorrelation values at one of the different symbol delays; by averaging autocorrelation values produced by the valid symbol delays; or by averaging and rounding the determined sample positions for the valid symbol delays.

Examples of identifying the largest autocorrelation value are provided above under the subtitle "Parallel ACF based Technique—Symbol Timing."

Referring to block 2005, an optimal sample position is determined based on the largest autocorrelation value. Referring to block 2007, the optimal symbol timing is determined based on the optimal sample position.

Examples of this method of identifying an optimal sample position are provided above under the subtitle "Parallel ACF based Synchronization—Symbol Timing."

Exemplary Methods for Synchronizing using Parallel ACF—Estimating CFO

Estimating the CFO is performed recursively for a predetermined number of times. The receiver is first synchronized based on the identified frequency hopping pattern. An iteration starts by obtaining a phase rotation of the packet received at a first symbol delay based on an estimated carrier frequency offset, for example at p1. The process flow continues to obtaining a residual phase rotation of the packet received at a second symbol delay larger than the first symbol delay, for example at p3. The carrier frequency offset is obtained based on the estimated carrier frequency offset and the residual phase rotation. The above steps can be performed iteratively until a predetermined number of iterations is reached.

Exemplary embodiments of the above operations are provided in the descriptions under the subtitle "Parallel ACF based Synchronization—Estimating CFO", with references to FIG. 14, and Equations 15-24.

Exemplary Methods for Synchronizing Using Parallel ACF—Detecting SFD

The SFD detection process begins after the receiver starts hopping. SFD is detected by detecting a polarity output pattern of the received signal that matches a predetermined polarity output pattern associated with the selected group.

Exemplary embodiments of the above operations are provided in the descriptions under the subtitle "Parallel ACF based Synchronization—Detecting SFD", with references to FIG. 15, and Equations 15-24.

Exemplary Systems for Synchronizing Using Parallel ACF

FIG. 16 illustrates a system 1600 for synchronizing to frequency hopped packets using Parallel ACF in accordance with an exemplary embodiment of the present disclosure. The system 1600 is implemented for a frequency hopping network and includes a transmitting device 1601, which transmits symbols to a receiving device 1603 via multiple frequency sub-bands in a sequence that follows a frequency hopping pattern. The plurality of frequency hopping patterns are partitioned into a plurality of disjoint groups, each group having a different associated periodicity. The transmitting device 1601 selects one of a finite set of predetermined frequency hopping patterns, and the selected pattern is used by all of the devices of the network.

The receiving device 1603 includes a receiving unit 1605 and a synchronizing unit 1607 coupled to the receiving unit 1605. The synchronizing unit 1607 detects packets without previous knowledge of the specific frequency hopping pattern selected by transmitting device 1601, and identifies a group of frequency hopping patterns and a frequency hopping pattern as described below.

The receiving device 1603 includes a receiving unit 1605 and a synchronizing unit 1607. The receiving unit 1603 receives a packet of preamble symbols respectively transmitted over the frequency sub-bands according to the selected frequency hopping pattern. In one implementation, the synchronizing unit 1607 is configured to synchronize to the received signal, wherein the synchronizing unit includes a plurality of autocorrelation units 1609, and a group identification unit 1615. The plurality of autocorrelation units 1609 compute in parallel, respective autocorrelation values of the signal received in a selected frequency sub-band at a plurality of symbol delays. The group identification unit 1615 selects one of the plurality of groups of frequency hopping patterns based on the autocorrelation values at the plurality of symbol delays.

Exemplary implementations of the autocorrelation units 1609, and the group identification unit 1615 are provided above under the subtitle "Parallel ACF based Synchronization—Synchronization Symbol Detection, TF group and TFC identification", with reference to FIGS. 7-11. Specifically, an exemplary pattern generation of the parallel ACF illustrated in FIG. 9 can be implemented as part of the group identification unit 1615. The exemplary parallel ACF, shown in FIGS. 7 and 8, can be implemented as part of the autocorrelation units 1609.

In some implementations, the system includes a frequency hopping pattern identification unit 1617, which identifies one of the plurality of frequency hopping patterns based on the selected group of frequency hopping patterns and the selected frequency sub-band if each frequency hopping pattern in the selected group of frequency hopping patterns specifies a sequence of the same frequency sub-band. The frequency hopping pattern identification unit 1617 identifies a frequency hopping pattern by receiving the signal at another frequency sub-band if any frequency hopping pattern in the selected group of frequency hopping patterns specifies a sequence of more than one frequency sub-band, wherein the other frequency sub-band is different from the selected frequency sub-band; and identifying one of the plurality of frequency hopping patterns based on analyzing autocorrelation values of the signal received in the other frequency sub-band at a selected one of the different symbol delays.

Examples of a frequency hopping pattern identification unit 1617 are provided above under the subtitle "Parallel ACF based Synchronization—Synchronization Symbol Detection, TF group and TFC identification", with reference to FIGS. 12, 13 and 17. Specifically, the operations in the flow chart illustrated in FIG. 12 can be implemented by the frequency hopping pattern identification unit 1617. The frequency hopping pattern identification unit 1617 identifies a frequency hopping pattern by receiving the signal at another frequency sub-band, as illustrated in FIGS. 13 and 17.

In some implementations, the system 1600 includes a carrier frequency offset estimating unit 1619 which estimates carrier frequency offset based on phase rotation of the signal caused by relative dock frequency offset in different symbol periods.

Examples of a carrier frequency offset estimating unit 1609 are provided above under the subtitle "Parallel ACF based Synchronization—Estimating CFO," with reference to FIG. 14. Specifically, the operations in the flow chart illustrated in FIG. 14 can be implemented by the carrier frequency offset estimating unit 1619.

In some implementations, the system 1600 includes a symbol timing optimizing unit 1621 which determines the optimal symbol timing by determining the optimal symbol timing based on the largest autocorrelation values associated with the plurality of symbol delays.

Examples of symbol timing optimizing unit 1621 are provided above under the subtitle "Parallel ACF based Synchronization—symbol timing." Specifically, the various examples of optimizing symbol timing, e.g. Example 1, Example 2, and Example 3 under the subtitle "Parallel ACF based Synchronization—symbol timing," can be implemented by the symbol timing optimizing unit 1621.

In some implementations, the system 1600 includes a start of frame delimiter detecting unit 1623 which detects a start of frame delimiter by detecting a polarity output pattern of the received signal that matches a predetermined polarity output pattern associated with the selected group.

Examples of start of frame delimiter detecting unit 1623 are provided above under the subtitle "Parallel ACF based Synchronization—detecting SFD," with reference to FIG. 15. Specifically, the operations in the flow chart illustrated in FIG. 15 can be implemented by the start of frame delimiter detecting unit 1623.

It should be noted that in accordance with an aspect of the present disclosure, the system 1600 illustrated in FIG. 16 can be employed in conjunction with a computer-based system, where the elements can be implemented in hardware, software, firmware, or combinations thereof.

Exemplary Embodiments of a Synchronization Unit Using Parallel ACF

A synchronization unit is configured to synchronize to a signal comprising a plurality of preamble symbols respectively transmitted over a plurality of frequency sub-bands according to a frequency hopping pattern.

Figure 21:
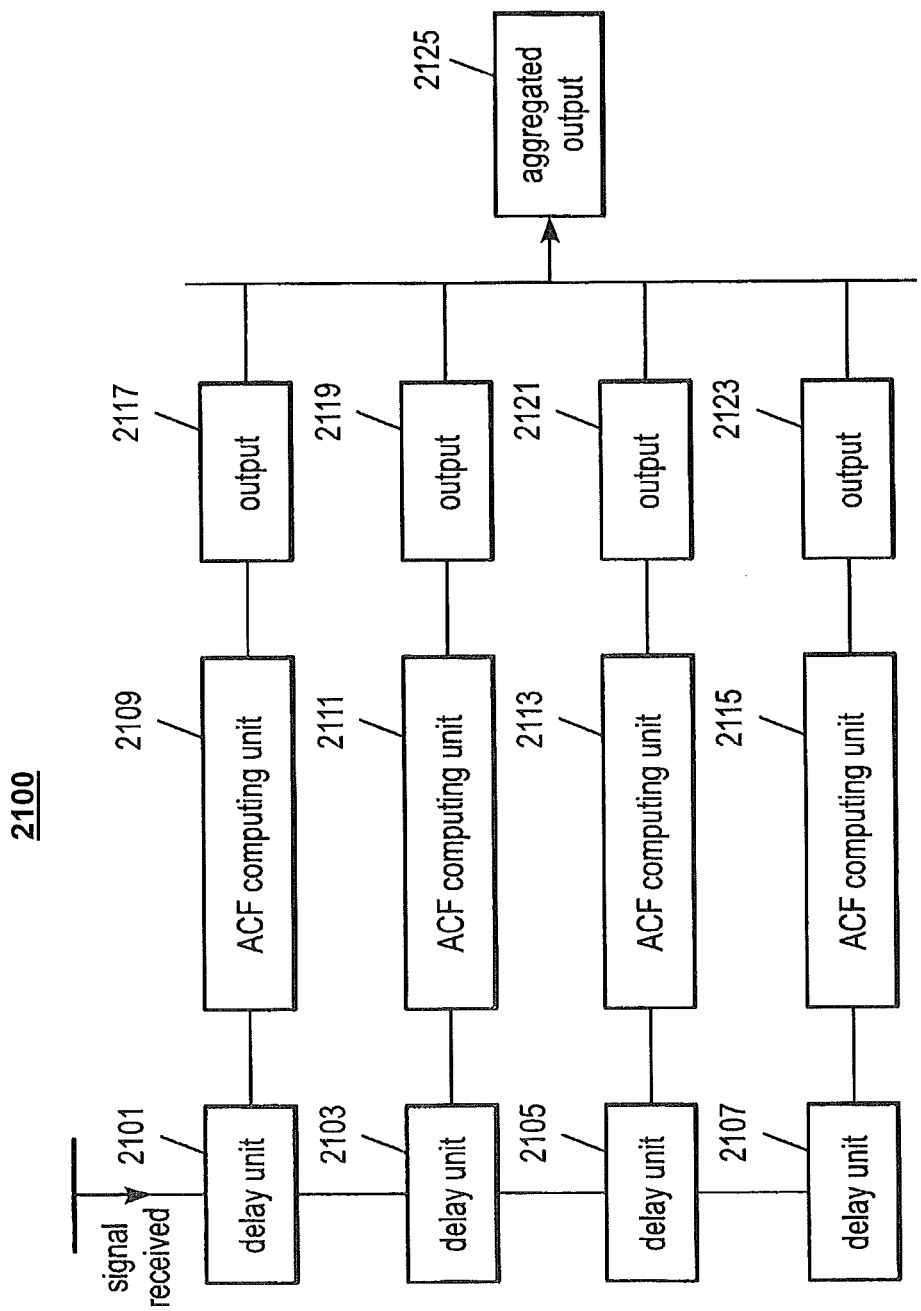
FIG. 21 illustrates an exemplary embodiment of a synchronization unit.

FIG. 21 illustrates an exemplary embodiment of the synchronization unit. In FIG. 21, the synchronization unit 2100 includes a plurality of delay units, for example, delay units, 2101, 2103, 2105 and 2107, which sequentially delays a received signal at increasingly larger symbol delays, The synchronization unit 2100 includes a plurality of autocorrelation value computing units, for example, ACE computing units., 2109, 2111, 2113 and 2115, which are respectively connected to the plurality of delay units 2101, 2103, 2105 and 2107. Each of the autocorrelation value computing units 2109, 2111, 2113 and 2115 computes autocorrelation values of the signal for a symbol delay corresponding to its connected delay unit. The synchronization unit 2100 includes a plurality of autocorrelation value output units, for example outputs 2117, 2119, 2121 and 2123, which are respectively connected to the plurality of autocorrelation value computing units; each of the autocorrelation value output units outputs autocorrelation values of the signal computed by its connected autocorrelation value computing unit. The plurality of autocorrelation value computing units 2109, 2111, 2113 and 2115 compute in parallel. The plurality of delays units are connected in a sequence.

The first of the plurality of delay units 2101 receives the signal, delays the signal for a first predetermined number of symbols, and outputs the delayed signal to an immediately downstream delay unit 2103.

A delay unit that is downstream of the first of the plurality of delay units receives a signal from its immediately upstream delay unit, delays the signal for a predetermined number of symbols, and outputs the delayed signal to immediately downstream delay unit, if there is one.

The synchronization unit can include an aggregate autocorrelation value output 2125 that outputs autocorrelation values of the signal computed by the plurality of autocorrelation value computing units.

FIGS. 7 and 8 illustrate exemplary embodiments of a synchronization unit based on a four parallel ACF structures.

It is assumed that the exemplary embodiments of a synchronization unit as illustrated in FIGS. 7 and 8 are used in MB-OFDM UWB based systems. In FIG. 8, a four parallel-ACF 510 takes input r(m) 101. Four delay units 540, 541, 542, 543 delay their inputs by $q_1$, $q_2$, $q_3$ and $q_4$ symbols in a sequence. The values of $q_1$, $q_2$, $q_3$ and $q_4$ are chosen in accordance with Equation 7.

In some implementations, the first delay unit 540 receives the signal from the input r(m) 101, delays the signal for one symbol period, and outputs the delayed signal to the second delay unit 541. The second delay unit 541 delays the signal further by one symbol so that the total symbol delay after the delay unit 541 is two. The second delay unit 541 outputs the delayed signal to the third delay unit 542, which delays the signal further by one symbol so that the total symbol delay after the third delay unit 542 is three. The third delay unit 542 outputs the delayed signal to the fourth delay unit 543, which delays the signal further by three symbols so that the total symbol delay after the fourth delay unit 543 is six.

In some implementations, the four autocorrelation value computing units 550, 551, 552, and 553 are respectively connected to four delay units 540, 541, 542, 543. The four autocorrelation value computing units 550, 551, 552, and 553 compute, in parallel, autocorrelation values of the signal delayed by the four delay units 540, 541, 542, and 543.

In some implementations, the ACF value A output 511, ACF value B output 512, ACF value C output 513 and ACF value D output 514, which are respectively connected to the autocorrelation value computing units 550, 551, 552, and 553, output the autocorrelation values computed by the four autocorrelation value computing units 550, 551, 552, and 553.

An exemplary embodiment of the aggregate autocorrelation value output can be the bus vector 520, as illustrated in FIG. 7. The bus vector 520 can aggregate the input the four outputs, ACF value A output 511, ACF value B output 512, ACF value C output 513 and ACF value D output 514.

Although the exemplary embodiments of the present disclosure for symbol synchronizing have been described in MB-OFDM UWB based systems, it should be noted that these techniques can also be adapted to other packet-based transmission schemes that use frequency hopping. Depending on the scheme, the number of the delay units, the autocorrelation value computing units and the autocorrelation value output units can be different from these numbers provided in the exemplary embodiments.

It should be noted that in accordance with an aspect of the present disclosure, the synchronization unit and its various components can be employed in conjunction with a computer-based system, where the elements can be implemented in hardware, software, firmware, or combinations thereof.

CONCLUSION

The present disclosure has been described with reference to a number of exemplary embodiments. However, it will be apparent to those skilled in the art that it is possible to embody the disclosure in specific forms other than those described above without departing from the spirit of the disclosure.

Although the exemplary embodiments of the present disclosure for symbol synchronizing have been described in MB-OFDM UWB based systems, it should be noted that these techniques can also be adapted to other packet-based transmission schemes that use frequency hopping. Depending on the scheme, the number of frequency sub-bands employed by the frequency hopping pattern, the number of groups of frequency hopping patterns, and the number of frequency hopping patterns can be greater than these numbers provided in the exemplary embodiments.

Accordingly, the various embodiments described herein are illustrative, and they should not be considered restrictive in any way. The scope of the disclosure is given by the appended claims, rather than the preceding description, and all variations and equivalents thereof that fall within the range of the claims are intended to be embraced therein.

What is claimed is:

1. A method for communications over a multi-band system, comprising:
   receiving a packet of preamble symbols respectively transmitted over a sequence of frequency sub-bands according to one of a plurality of frequency hopping patterns, wherein the plurality of frequency hopping patterns are partitioned into a plurality of disjoint groups, each group having a different associated periodicity;
   computing, in parallel, respective autocorrelation values of the packet received in a selected frequency sub-band at a plurality of symbols delays; and
   selecting one of the plurality of groups of frequency hopping patterns based on the autocorrelation values at the plurality of symbol delays.

2. The method of claim 1, wherein the selecting one of the plurality of groups of frequency hopping patterns comprises:
   comparing the autocorrelation values for each of the plurality of symbol delays to a threshold;
   selecting the one of the plurality of groups of frequency hopping patterns based on the comparing.

3. The method of claim 2, further comprising
   generating a binary output pattern based on the comparing, bits of the binary output pattern respectively corresponding to the plurality of symbol delays,
   wherein the binary output pattern is used for selecting the one of the plurality of groups of frequency hopping patterns.

4. The method of claim 1, wherein
   the frequency sub-bands include a first frequency sub-band, a second frequency sub-band and a third frequency sub-band;
   the plurality of frequency hopping patterns include time-frequency code (TFC)-1, TFC-2, TFC-3, TFC-4, TFC-5, TFC-6, and TFC-7 in accordance with European Computer Manufacturers Association (ECMA)-316, and
   a first group of frequency hopping patterns includes TFC-1 and TFC-2, a second group of frequency hopping patterns includes TFC-3 and TFC-4, and a third group of frequency hopping patterns includes TFC-5, TFC-6 and TFC-7.

5. The method of claim 4, wherein the selecting one of the plurality of groups of frequency hopping patterns comprises:
   comparing absolute values of the autocorrelation values for each of the plurality of symbols delays to a threshold;
   generating a binary output pattern based on the comparing, bits of the binary output pattern respectively corresponding to the plurality of symbol delays; and
   selecting one of the first group frequency hopping patterns, the second group frequency hopping patterns, and the third group of frequency hopping patterns based on the binary output pattern.

6. The method of claim 1, further comprising:
   if each frequency hopping pattern in the selected group of frequency hopping patterns specifies a sequence of the same frequency sub-band, identifying one of the plurality of frequency hopping patterns based on the selected frequency sub-band;
   if a frequency hopping pattern in the selected group of frequency hopping patterns specifies a sequence of more than one frequency sub-band, receiving the packet at a frequency sub-band that is different from the selected frequency sub-band; and identifying one of the plurality of frequency hopping patterns based on analyzing autocorrelation values of the packet received in the different frequency sub-band.

7. The method of claim 6, wherein identifying the one of the plurality of frequency hopping patterns based on analyzing autocorrelation values of the packet received in the different frequency sub-band comprises:
   determining a symbol period delay between a time switching to the different frequency sub-band and a time when a peak of the autocorrelation values of the packet received in the different frequency sub-band appears; and
   identifying a frequency hopping pattern within the selected group based on the determined symbol period delay.

8. The method of claim 7, wherein the determining the symbol period delay comprises:
   comparing peaks of the autocorrelation values of the packet received in the different frequency sub-band at symbol period delays that correspond to frequency hopping patterns within the selected group; and
   determining symbol period delay based on the amplitude of the peaks.

9. The method of claim 6, further comprising:
determining, based on the selected groups of frequency hopping patterns, one or more valid symbol delays at which valid autocorrelation values are produced;
searching for the largest of autocorrelation values at the one or more valid symbol delays;
determining a sample position that corresponds to the largest autocorrelation value; and
determining optimal symbol timing based on the determined sample position.

10. The method of claim 6, further comprising:
determining, based on the selected groups of frequency hopping patterns, one or more valid symbol delays at which valid autocorrelation values are produced;
averaging autocorrelation values at the valid symbol delays;
searching for the largest autocorrelation value among the averaged autocorrelation values;
determining a sample position that corresponds to the largest averaged autocorrelation value; and
determining optimal symbol timing based on the determined sample position.

11. The method of claim 6, further comprising:
determining, based on the selected groups of frequency hopping patterns, one or more valid symbol delays at which valid autocorrelation values are produced;
for each of the valid symbol delays, searching for a largest autocorrelation value and determining a sample position based on the largest autocorrelation value; and
determining the optimal symbol timing based on averaging and rounding of the determined sample positions for the one or more valid symbol delays.

12. The method of claim 6, further comprising:
synchronizing based on the identified frequency hopping pattern; and
obtaining carrier frequency offset;
wherein the obtaining carrier frequency offset includes
    obtaining a phase rotation of the packet received at a first symbol delay based on an estimated carrier frequency offset;
    obtaining a residual phase rotation of the packet received at a second symbol delay, which is larger than the first symbol delay; and
    obtaining the carrier frequency offset based on the estimated carrier frequency offset and the residual phase rotation.

13. The method of claim 6, further comprising:
synchronizing based on the identified frequency hopping pattern; and
detecting start of frame delimiter by detecting polarity output pattern of the received packet at the plurality of symbol delays that matches a predetermined polarity output pattern associated with the selected group.

14. A synchronization system for communications over a multi-band system, comprising:
a circuit configured to implement the following:
a receiving unit configured to receive a packet comprising preamble symbols respectively transmitted over a sequence of frequency sub-bands according to one of a plurality of frequency hopping patterns, wherein the plurality of frequency hopping patterns are partitioned into a plurality of disjoint groups, each group having a different associated periodicity; and
a synchronizing unit coupled to the receiver unit configured to synchronize to the received packet, wherein the synchronizing unit includes a plurality of autocorrelation units, which compute, in parallel, respective autocorrelation values of the packet received in a selected frequency sub-band at a plurality of symbol delays.

15. The system of claim 14, wherein the synchronizing unit comprises a group identification unit, wherein the group identification unit selects one of the plurality of groups of frequency hopping patterns based on the autocorrelation values at the plurality of symbol delays.

16. The system of claim 15, wherein the group identification unit selects the one of the plurality of groups of frequency hopping patterns by generating a threshold indication output by comparing absolute values of the autocorrelation values for each of the symbol delays to a threshold; the generated threshold indication output for each of the symbol delays forming a threshold indication output pattern;
comparing the threshold indication output pattern to respective patterns of the plurality of groups of frequency hopping patterns; and
selecting the one of the plurality of groups of frequency hopping patterns based on the generated output pattern.

17. The system of claim 15, wherein the synchronizing unit comprises a frequency hopping patterns identification unit connected to the group identification unit, wherein
if each frequency hopping pattern in the selected group of frequency hopping patterns specifies a sequence of the same frequency sub-band, the frequency hopping patterns identification unit identifies one of the plurality of frequency hopping patterns based on the selected group of frequency hopping patterns and the selected frequency sub-band;
if a frequency hopping pattern in the selected group of frequency hopping patterns specifies a sequence of more than one frequency sub-band, the frequency hopping patterns identification unit receives the packet a different frequency sub-band, and identifies one of the plurality of frequency hopping patterns based on analyzing autocorrelation values of the packet received in the different frequency sub-band.

18. The system of claim 15, further comprising a carrier frequency offset estimating unit connected to the frequency hopping patterns unit, wherein the carrier frequency offset estimating unit estimates carrier frequency offset based on phase rotation of the packet caused by relative clock frequency offset in different symbol periods.

19. The system of claim 15, further comprising a symbol timing optimizing unit connected to the frequency hopping patterns identification unit, wherein the symbol timing optimizing unit determines the optimal symbol timing based on autocorrelation values associated with the plurality of symbol delays.

20. The system of claim 15, further comprising a start of frame delimiter detecting unit connected to the frequency hopping patterns unit, wherein the start of frame delimiter detecting unit detects start of frame delimiter by detecting polarity output pattern of the received packet at the symbol delays that matches a predetermined polarity output pattern associated with the selected group.

21. The system of claim 14, wherein the autocorrelation units includes a plurality of delay units, a first of the plurality of delay units receiving the packet from the receiving unit, and delaying the packet for a first predetermined number of symbols, and a second of the plurality of delay units receiving its packet form its immediately upstream delay unit, and delaying the packet for a second number of symbols.

22. The synchronization unit of claim 21, wherein the plurality of delays units are connected in a sequence.

* * * * *